United States Patent [19]

(12) United States Patent
Gummadi et al.

(10) Patent No.: US 12,101,690 B2
(45) Date of Patent: Sep. 24, 2024

(54) DETERMINING POSITION INFORMATION

(71) Applicant: QUALCOMM Incorporated, San Diego, CA (US)

(72) Inventors: Bapineedu Chowdary Gummadi, Hyderabad (IN); Stephen William Edge, Escondido, CA (US); Xiaoxin Zhang, Sunnyvale, CA (US); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 17/355,393

(22) Filed: Jun. 23, 2021

(65) Prior Publication Data
US 2022/0417706 A1 Dec. 29, 2022

(51) Int. Cl.
| H04W 4/029 | (2018.01) |
| G01S 5/00 | (2006.01) |
| G01S 5/02 | (2010.01) |
| H04B 7/06 | (2006.01) |
| H04W 4/02 | (2018.01) |
| H04W 84/12 | (2009.01) |

(52) U.S. Cl.
CPC ............. *H04W 4/029* (2018.02); *G01S 5/011* (2020.05); *G01S 5/0236* (2013.01); *H04B 7/0626* (2013.01); *H04W 4/027* (2013.01); *H04W 84/12* (2013.01)

(58) Field of Classification Search
CPC ..... H04W 4/029; H04W 4/027; H04W 84/12; G01S 5/011; G01S 5/0236; H04B 7/0626
See application file for complete search history.

(56) References Cited

U.S. PATENT DOCUMENTS

| 10,104,195 B2 * | 10/2018 | Chen ..................... H04W 4/029 |
| 2013/0311080 A1 | 11/2013 | Wirola et al. |
| 2017/0272911 A1 * | 9/2017 | Agrawal ............... G01S 5/0242 |

(Continued)

FOREIGN PATENT DOCUMENTS

| CN | 106358154 | 1/2017 |
| KR | 20200107419 | 9/2020 |

OTHER PUBLICATIONS

P. Chen, F. Liu, S. Gao, P. Li, X. Yang and Q. Niu, "Smartphone-Based Indoor Fingerprinting Localization Using Channel State Information," in IEEE Access, vol. 7, pp. 180609-180619, 2019, doi: 10.1109/ACCESS.2019.2958957. (Year: 2019).*

(Continued)

*Primary Examiner* — Umair Ahsan
(74) *Attorney, Agent, or Firm* — Weaver Austin Villenueve & Sampson LLP

(57) ABSTRACT

A mobile device is disclosed. The mobile device may receive one or more wireless local area network (WLAN) signals. The mobile device may determine Channel State Information (CSI) data from the one or more WLAN signals. The mobile device may determine one or more environmental characteristics associated with an environment of the mobile device based on the CSI data. The mobile device may send information indicative of the one or more environmental characteristics to a location server (LS), or determine a position of the mobile device based at least in part on the one or more environmental characteristics, or any combination thereof.

13 Claims, 13 Drawing Sheets

(56) References Cited

U.S. PATENT DOCUMENTS

2021/0241173 A1* 8/2021 Li ........................... H04W 4/02
2022/0256429 A1* 8/2022 Martinez ............. H04W 36/245

OTHER PUBLICATIONS

International Search Report and Written Opinion—PCT/US2022/071998—ISA/EPO—Jul. 18, 2022.
Zhao L., et al., "An improved WiFi Indoor Localization Method Combining Channel State Information and Received Signal Strength", Proceedings of the 36th Chinese Control Conference (CCC), Technical Committee on Control Theory, CAA, Jul. 26, 2017, pp. 8964-8969, X20170726-20170728, XP033150164, DOI: 10.23919/CHICC.2017.8028783 [retrieved on Sep. 7, 2017] abstract, p. 9864, right-hand column, last paragraph.
Ma Y., et al., "WiFi Sensing with Channel State Information: a Survey", ACM Computer Survey, vol. 52, No. 3, Article 46, Jun. 2019, pp. 46.1-46.36.

* cited by examiner

DETERMINING POSITION INFORMATION

BACKGROUND

1. Field of Disclosure

The present disclosure relates generally to the field of wireless communications, and more specifically to determining position information using wireless signals.

2. Description of Related Art

With the proliferation of mobile devices, location-based services (e.g., map applications, navigation applications, device finders, or the like) are of increased importance. In some cases, it may be difficult to quickly and accurately determine position information of a device. For example, in an instance in which a device is indoors, it may be difficult to determine position information using satellite-based positioning techniques. Quick and accurate determination of position information may have safety implications. For example, it is important to be able to quickly and accurately locate a lost child. As another example, it is important for vehicles in motion to be able to quickly and accurately determine location.

BRIEF SUMMARY

An example method of determining a position of a User Equipment (UE), according to this disclosure, comprises receiving, at the UE, one or more wireless local area network (WLAN) signals determining Channel State Information (CSI) data from the one or more WLAN signals. The method also comprises determining one or more environmental characteristics associated with an environment of the UE based on the CSI data. The method also comprises sending information indicative of the one or more environmental characteristics to a location server (LS), or determining the position of the UE based at least in part on the one or more environmental characteristics, or any combination thereof.

An example method of determining positioning information by a Location Server (LS), according to this disclosure, comprises receiving, at the LS and from a User Equipment (UE), one or more environmental characteristics, based on WLAN sensing. The method also comprises determining positioning information for the UE based at least in part on the one or more environmental characteristics.

An example mobile device, according to this disclosure, comprises a transceiver, a memory, and one or more processing units communicatively coupled with the transceiver and the memory. The one or more processing units are further configured to receive one or more WLAN signals. The one or more processing units are further configured to determine Channel State Information (CSI) data from the one or more WLAN signals. The one or more processing units are further configured to determine one or more environmental characteristics associated with an environment of the mobile device based on the CSI data. The one or more processing units are further configured to send information indicative of the one or more environmental characteristics to a location server (LS), or determine a position of the mobile device based at least in part on the one or more environmental characteristics, or any combination thereof.

An example location server (LS) for determining positioning information, according to this disclosure, comprises a transceiver, a memory, and one or more processing units communicatively coupled with the transceiver and the memory. The one or more processing units are further configured to receive, from a User Equipment (UE), one or more environmental characteristics, based on WLAN sensing. The one or more processing units are further configured to determine positioning information for the UE based at least in part on the one or more environmental characteristics.

BRIEF DESCRIPTION OF THE DRAWINGS

Like reference symbols in the various drawings indicate like elements, in accordance with certain example implementations.

DETAILED DESCRIPTION

Figure 1:
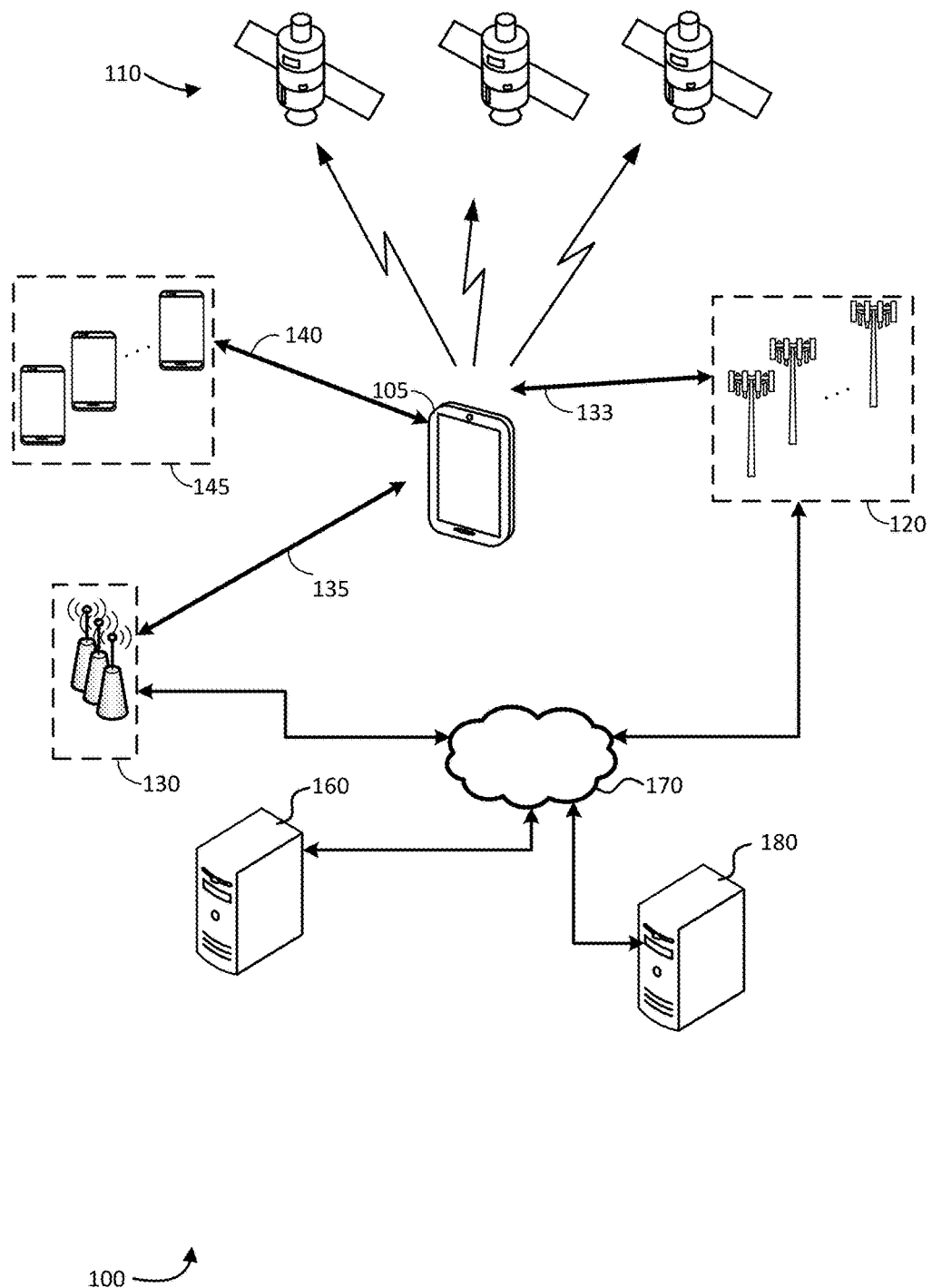
FIG. 1 is a diagram of a positioning system, according to an embodiment.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

In some embodiments, as described herein, a User Equipment (UE) device can perform Wireless Local Area Network (WLAN) sensing and can determine environmental characteristics of a current environment of the UE based on WLAN sensing information. For example, in some embodiments, the environmental characteristics may include one or more environmental classifications associated with the current environment of the UE, such as whether the UE is in an enclosed space or an open space, whether the UE is in motion or is substantially still, whether the UE is in a high-density area (e.g. a dense urban area or an area with many objects, vehicles and/or people nearby) or a low-density area, or the like. As another example, in some embodiments, the environmental characteristics may include identifications of one or more landmarks or milestones in the current environment, such as an identification of a bridge, statue, sign, a particular building, or the like. As yet another example, in some embodiments, the environmental characteristics may include an estimation of a number of people or objects (e.g., vehicles, animals, plants, buildings, and/or any other objects) in the current environment and nearby to the UE (e.g. within 20 to 100 meters of the UE). As still another example, in some embodiments, the environmental characteristics may include an inference of a type of location associated with the current environment. As a more particular example, the inference may be that the UE is in a garden or park in response to determining that the current environment includes a high density of plants. As another more particular example, in some embodiments, the inference may be that the UE is in a gathering of people (e.g., at an event such as a concert, festival, or the like) in response to determining that the current environment includes a high density of people.

In some embodiments, the environmental characteristics may be used to determine a position of the UE. For example, in some embodiments, the UE may use the environmental characteristics to query a database that identifies a position or location of the UE based on a location of a physical landmark or milestone indicated in the environmental characteristics. As another example, in some embodiments, the UE may transmit the environmental characteristics to a location server. Continuing with this example, the location server may use the environmental characteristics to identify the position of the UE, which may then be transmitted back to the UE. Additionally or alternatively, in some embodiments, the location server may configure assistance data based on the environmental characteristics, where the configured assistance data causes the UE to determine position based on the environmental characteristics. As a specific example, in an instance in which the environmental characteristics indicate that the UE is in motion and/or is in motion with a velocity over a predetermined velocity threshold, the configured assistance data may cause the UE to measure Position Reference Signals (PRS) more frequently than if the UE would otherwise. As another specific example, in an instance in which the environmental characteristics indicate that the UE is in an enclosed space (and may therefore not have a Line of Sight (LOS) to a wireless cellular base station for obtaining Global Navigation Satellite System (GNSS)-based positioning information), the configured assistance data may cause the UE to use indoor positioning sources to determine the position of the UE.

In some embodiments, the environmental characteristics associated with a current environment of a UE may be used to communicate positioning information of the UE to devices other than the UE. For example, the positioning information may be communicated to the other devices in connection with a "Device Finder" or "Friend Finder" application, in connection with emergency services, or the like. As a specific example, in an instance in which the environmental characteristics indicate that a UE associated with a lost child is in a crowded environment (e.g., a crowded environment that is hosting an event), information indicating that the lost child may be in the crowded environment may be transmitted to an emergency service to more quickly locate the lost child.

FIG. 1 is a simplified illustration of a positioning system 100 in which a UE 105, location server (LS) 160, and/or other components of the positioning system 100 can use the techniques provided herein for determining position information of UE 105, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated position of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated position of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When one or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
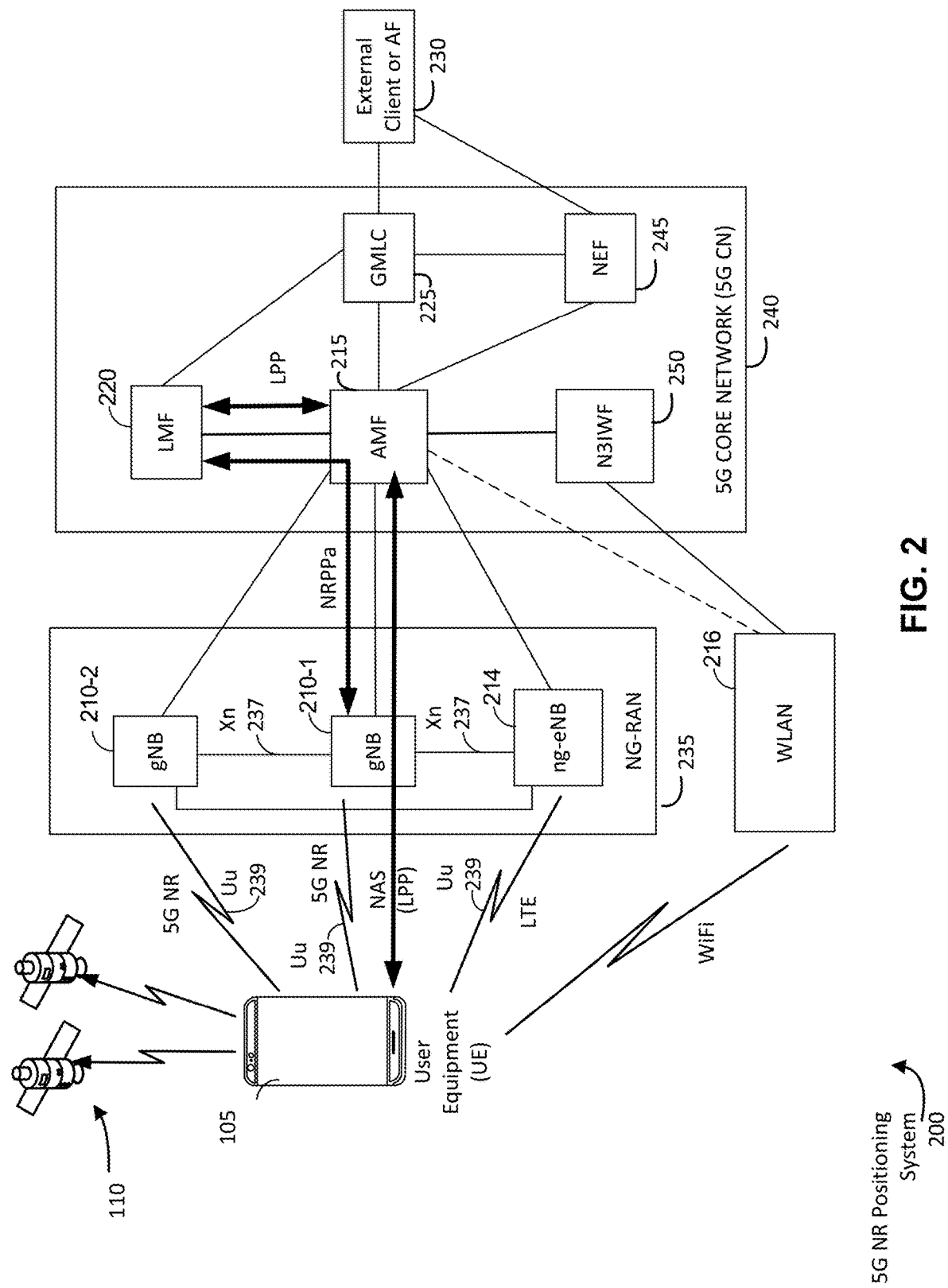
FIG. 2 is a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200. In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AOA), angle of departure (AOD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AOD, and/or ECID. The NRPPa protocol may be used to support positioning of UE 105 using network based position methods such as ECID, AOA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AOA, Receive Time-Transmission Time Difference (Rx-Tx), Differential AOA (DAOA), AOD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AOA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AOD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AOD and/or AOA.

Figure 3:
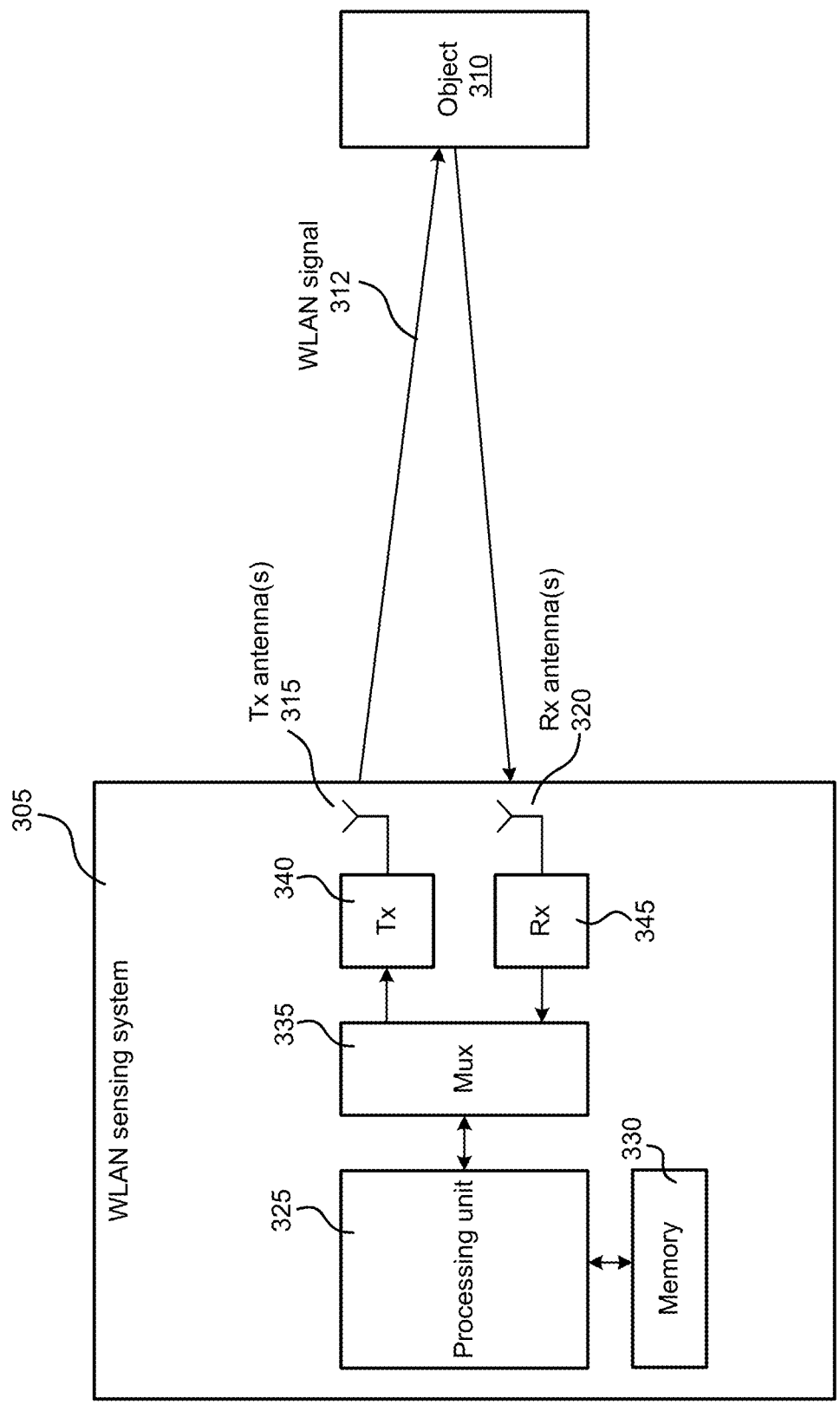
FIG. 3 is a schematic diagram of a WLAN sensing system.

FIG. 3 is a block diagram of an example WLAN sensing system 305 capable of performing WLAN sensing as described herein. In some embodiments, WLAN sensing system 305 may be implemented by UE 105 shown in FIGS. 1 and 2. Additionally or alternatively, in some embodiments, WLAN sensing system 305 may use WLAN signals from other sources. In some embodiments, the other sources may include APs 103 of FIG. 1, WLAN 216 of FIG. 2, and/or other suitable source devices.

In brief, the WLAN sensing system 305 uses one or more WLAN signals comprising one or more waveforms, sequences, or packets to determine the presence and/or movement of an object. This can be done by using WLAN signals for channel capture, performing channel estimation to obtain a Channel Impulse Response (CIR), a Channel Frequency Response (CFR), and/or other forms of Channel State Information (CSI) indicative of the presence and/or movement of the object. The CSI is indicative of aspects of the WLAN signals such as multipath, reflections, and signal strength of each path. More broadly, CSI may represent the combined effect on WLAN signals of, for example, one or more of reflection, scattering, fading, refraction, attenuation, and/or power decay with distance. According to some embodiments, channel estimation used in forms of wireless communication systems can be used to obtain CSI. (In wireless communication, CSI is used to properly demodulate and decode a received packet.) Thus, embodiments can leverage existing channel estimation techniques to obtain CSI for WLAN sensing purposes.

More specifically, the WLAN sensing system 305 can obtain CSI associated with WLAN signal 312, reflected (in this example) from object 310. According to some embodiments, the WLAN sensing system 305 can use the CSI to calculate a distance and an angle of arrival corresponding to the reflected signal received by Rx antenna(s) 320. For instance, the WLAN sensing system 305 can determine distance by calculating a time of flight for the reflected signal based on the difference between a leakage signal (not illustrated) and the reflected signal. In further examples, the WLAN sensing system 305 can determine an angle of arrival by utilizing an antenna array (e.g., Rx antenna(s) 320) to receive the reflected signals and measuring the difference in received phase at each element of the antenna array.

As indicated in more detail hereafter, the WLAN sensing system 305 can utilize the distance and/or an angle of arrival corresponding a reflected signal to detect a presence or movement of an object (e.g. a person, a vehicle, a wall, furniture, and/or any other object).

In some embodiments, the WLAN sensing system 305 may utilize artificial intelligence or machine learning algorithms to perform motion detection, object classification, object orientation determination, or the like. In some examples, the machine learning techniques can include supervised machine learning techniques such as those that utilize neural networks, linear and logistics regression, classification trees, support vector machine, any other suitable supervised machine learning technique, or any combination thereof. For instance, a dataset of sample WLAN sensing data can be selected for training of the machine learning algorithms or artificial intelligence.

The WLAN sensing techniques described herein may be performed irrespective of their association with a WLAN network. For example, the WLAN sensing system 305 that uses Wi-Fi wireless technologies may utilize a Wi-Fi transmitter and Wi-Fi receiver to perform WLAN sensing as discussed herein when it is not associated with any access point or Wi-Fi network.

Generally speaking, with regard to the functionality of the WLAN sensing system 305 in FIG. 3, the WLAN sensing system 305 can detect an object 310 by generating a WLAN signal (e.g., comprising one or more pulses) transmitted by one or more Tx antennas 315 that reflect off of the object 310 and are received by one or more Rx antennas 320. The received signals can then be processed by the WLAN sensing system 305 using digital signal processing (DSP) techniques (including leakage cancellation) to determine the object's presence and/or range. The process of transmitting, receiving, and processing signals is generally referred to herein as a WLAN sensing "scan." As discussed in more detail herein, the frequency or periodicity of scans may vary depending on a type of transmission mode (e.g., low-resolution or high-resolution scanning), but often may be several times per second.

In some embodiments, a WLAN sensing system 305 may have a plurality of Rx antennas 320. WLAN radios, for example, commonly have 2 to 4 antennas. In such embodiments, CSI received at different Rx antennas 320 can be used to determine angular information (e.g., by using Rx beamforming, determining angular information phase differences, or the like). In some implementations, embodiments with two antennas have achieved angular granularity of 10° to 15°, for example, and embodiments with four antennas have achieved granularity of 2° to 3°. Moreover, in some other embodiments, a WLAN sensing system 305 may have a plurality of Tx antennas 315. WLAN radios, for example, commonly have 2 to 4 antennas. In such embodiments, the phase of the Tx antennas can be configured to transmit the WLAN signal in a beam pointing at a certain direction. In some implementations, embodiments with two Tx antennas have achieved angular granularity of 10° to 15°, for example, and embodiments with four Tx antennas have achieved granularity of 2° to 3°. Changes in CSI over time (e.g., from one scan to the next) are indicative of motion of the object 310. Here changes may comprise changes in amplitude or phase of CSI. Additionally or alternatively, changes may comprise changes in the metrics extracted and/or estimated from CSI, such as time of flight and angle of each reflected path, etc. Thus, WLAN signals can be used to determine object location, volume, and movement.

This functionality of the WLAN sensing system 305 is enabled through the use of a processing unit 325, memory 330, multiplexer (mux) 335, Tx processing circuitry 340, and Rx processing circuitry 345. The WLAN sensing system 305 may include additional components not illustrated, such as a power source, user interface, or electronic interface. It can be noted, however, that these components of WLAN sensing system 305 may be rearranged or otherwise altered in alternative embodiments, depending on desired functionality. Moreover, as used herein, the terms "transmit circuitry," "Tx circuitry," or "Tx processing circuitry" refer to any circuitry utilized to create and/or transmit the RF signal. Likewise, the terms "receive circuitry," "Rx circuitry," or "Rx processing circuitry" refer to any circuitry utilized to detect and/or process the RF signal. As such, "transmit circuitry" and "receive circuitry" may not only comprise the Tx processing circuitry 340 and Rx processing circuitry 345 respectively, but also may comprise the mux 335 and processing unit 325. In some embodiments, the processing unit 325 may compose at least part of a modem and/or wireless communications interface. In some embodiments, more than one processing unit may be used to perform the functions of the processing unit 325 described herein. Additionally, although Tx antenna(s) 315 and Rx antenna(s) 320 are illustrated as being separate antennas, some embodiments may use the same one or more antennas for transmission and reception.

The Tx processing circuitry 340 and Rx processing circuitry 345 may comprise subcomponents for respectively generating and detecting WLAN signals. As a person of ordinary skill in the art will appreciate, the Tx processing circuitry 340 may therefore include a pulse generator, digital-to-analog converter (DAC), a mixer (for up-mixing the signal to the transmit frequency), one or more amplifiers (for powering the transmission via Tx antenna(s) 315), etc. The Rx processing circuitry 345 may have similar hardware for processing a detected WLAN signal. In particular, the Rx processing circuitry 345 may comprise an amplifier (for amplifying a signal received via Rx antenna(s) 320), a mixer for down-converting the received signal from the transmit frequency, an analog-to-digital converter (ADC) for digitizing the received signal, and a pulse correlator providing a matched filter for the pulse generated by the Tx processing circuitry 340. The Rx processing circuitry 345 may therefore use the correlator output as the CIR, which can be processed by the processing unit 325 (or other circuitry) for leakage cancellation, for example. Other processing of CSI obtained from the WLAN signal may also be performed, such as object detection, range, motion, direction of departure (DoD) or direction of arrival (DoA) estimation.

It can be noted that the properties of the transmitted WLAN signal 312 may vary, depending on the technologies utilized. As previously indicated, techniques provided herein can apply to WLAN technologies, which typically operate at 2.4, 5, and 6 GHz, but may include frequencies ranging from 900 MHz to 60 GHz. (That said, some embodiments may utilize RF frequencies outside this range.) This includes, for example, frequencies utilized by the 802.11ad Wi-Fi standard (operating at 60 GHz). Because WLAN sensing may be performed in the same frequency bands as communication, hardware may be utilized for both communication and WLAN sensing. For example, one or more of the components of the WLAN sensing system 305 shown in FIG. 3 may be included in a wireless modem (e.g., Wi-Fi or 5G modem) of a television. That said, embodiments may utilize a WLAN sensing system 305 independent of any such communication means. As noted, for example, some embodiments may utilize Ultra-Wideband (UWB) transceivers. Techniques for WLAN sensing described may utilize various types of RF signals, such as Zadoff sequences, Orthogonal Frequency-Division Multiplexing (OFDM) Long Training Field (LTF)-like symbols for channel capture to determine the presence and/or movement of the object 310. Because the WLAN sensing system may be capable of sending WLAN signals for communication (e.g., using 802.11 communication technology), embodiments may leverage channel estimation used in communication to obtain CSI for performing WLAN sensing as provided herein. In Wi-Fi, channel estimation may be done by using Legacy Long Training Field (L-LTF) and High Throughput (HT)/Very High Throughput (VHT)/High-Efficiency Long Training Field (HE-LTF) in a communication packet preamble. Embodiments may use a similar approach, for example, by using a known transmitted signal for channel estimation.

Figure 4A:
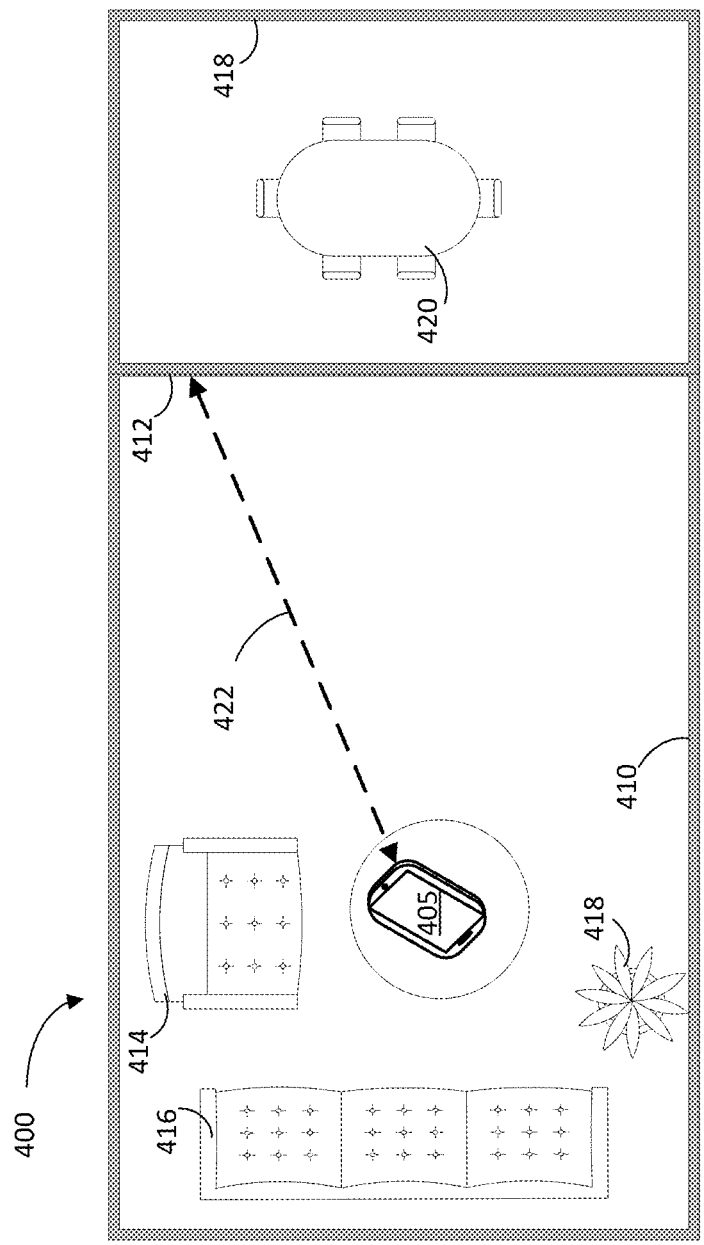
FIGS. 4A and 4B are top views of example room environments.

FIG. 4A is a top view of an example room environment 400, illustrating how WLAN sensing may be used by a UE (e.g., UE 405) to determine environmental characteristics, according to an embodiment. UE 405 may implement a WLAN sensing system, as shown in and described above in connection with FIG. 3. In the example illustrated in FIG. 4A, UE 405 has a transceiver, which may transmit WLAN signals and may receive WLAN signals reflected off of various objects in room environment 400. A person of ordinary skill in the art will appreciate that, because the transceiver of UE 405 may perform both transmit and receive functions at the same time, the transceiver may implement leakage mitigation and/or similar algorithms to help minimize interference between the transmit and receive functions. In some embodiments, the transceiver of UE 405 can capture Channel State Information (CSI) and can determine environmental characteristics based on the captured CSI.

As illustrated in FIG. 4A, UE 405 may detect various objects in room environment 400, such as walls 410, 412, and/or 418, a chair 414, a sofa 416, a plant 418, and/or a table 420. It should be noted that, in some embodiments, UE 405 may detect objects that are in the same room as UE 405 (e.g., such as walls 410 and/or 412, chair 414, sofa 416, and/or plant 418) and/or in a different room as UE 405 (e.g., such as wall 418 and/or table 420).

UE 405 may detect objects in room environment 400, based on reflections of WLAN signals from various objects in room environment 400. These reflections may be identified in captured WLAN sensing data, such as CSI, and used to determine the presence of various objects by comparing the WLAN sensing data (comprising the captured CSI and/or information derived therefrom) with previously-obtained WLAN sensing data (e.g., from CSI captured during a calibration procedure). In some embodiments, the CSI data may be used as an input to a trained machine learning model (e.g., a classifier, a neural network, or the like), which may generate an output that indicates an object corresponding to the captured CSI data.

As a specific example of how wall 412 may be detected, portions of the WLAN signals that travel along WLAN signal path 422 may reflect off wall 412, where the reflections are received by the transceiver of UE 405. The presence of wall 412, as well as other information related to wall 412 (e.g., height, thickness, or the like) may be determined based on CSI-derived information indicative of the detection of an object having dimensions similar to those of a wall.

Figure 4B:
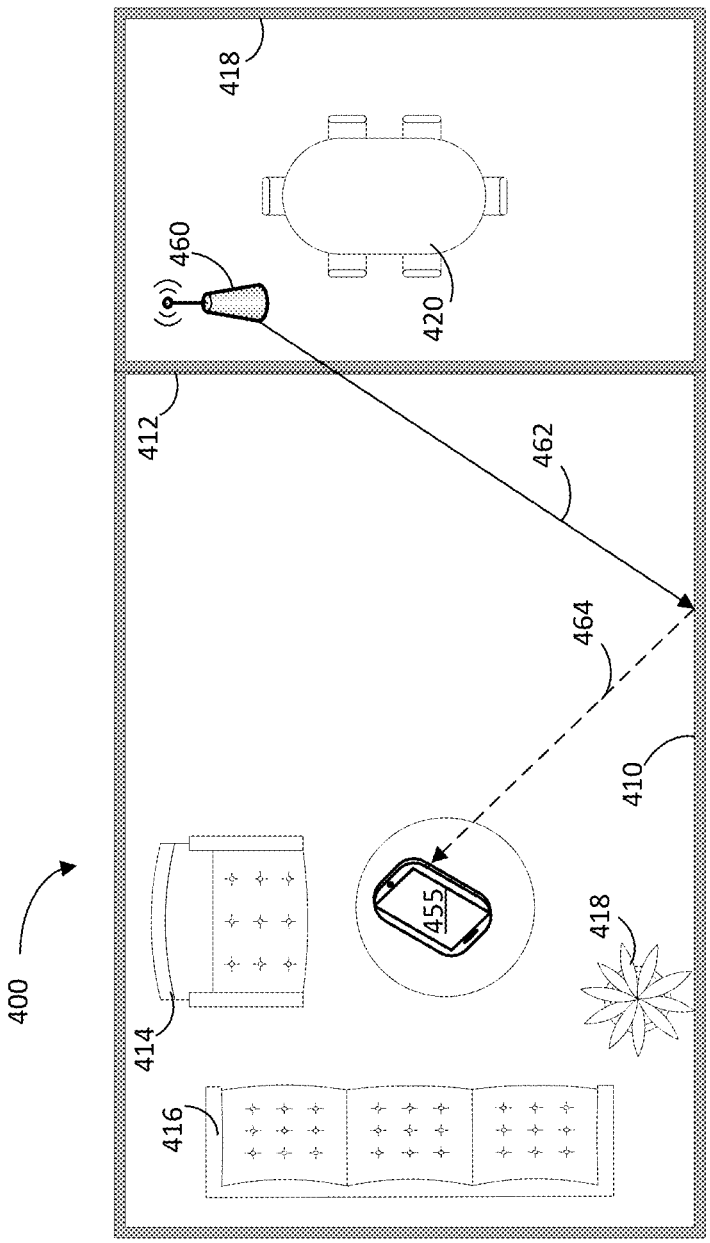

FIG. 4B is a top view of room environment 400 illustrating how WLAN sensing may be performed according to another embodiment. In the example illustrated in FIG. 4B, rather than UE 405 transmitting and receiving WLAN signals, a first transceiver 460 (e.g., of a Wi-Fi access point such as one of APs 130 of FIG. 1, another UE such as one of UEs 145 of FIG. 1, or the like) may transmit WLAN signals, which may be reflected off various objects in room environment. A second transceiver (e.g., of UE 455) may receive reflected WLAN signals (e.g., reflected off of various objects in the room, such as walls 410, 412, and/or 418, chair 414, sofa 416, plant 418, and/or table 420).

As a specific example of how WLAN sensing may be performed in the example shown in FIG. 4B to detect wall 410, portions of WLAN signals that travel along a WLAN signal path 462 transmitted by the first transceiver 460 may be reflected off of wall 410. The reflections, along WLAN signal path 464, may be detected by a transceiver of UE 455. The reflections may be identified in the captured WLAN sensing data, such as CSI, and used to determine the presence of wall 410. For example, similar to what is described above in connection with FIG. 4A, wall 410 may be identified by comparing WLAN sensing data (comprising the captured CSI and/or information derived therefrom) with previously-obtained WLAN sensing data (e.g., from CSI captured during a calibration procedure).

Figure 5:
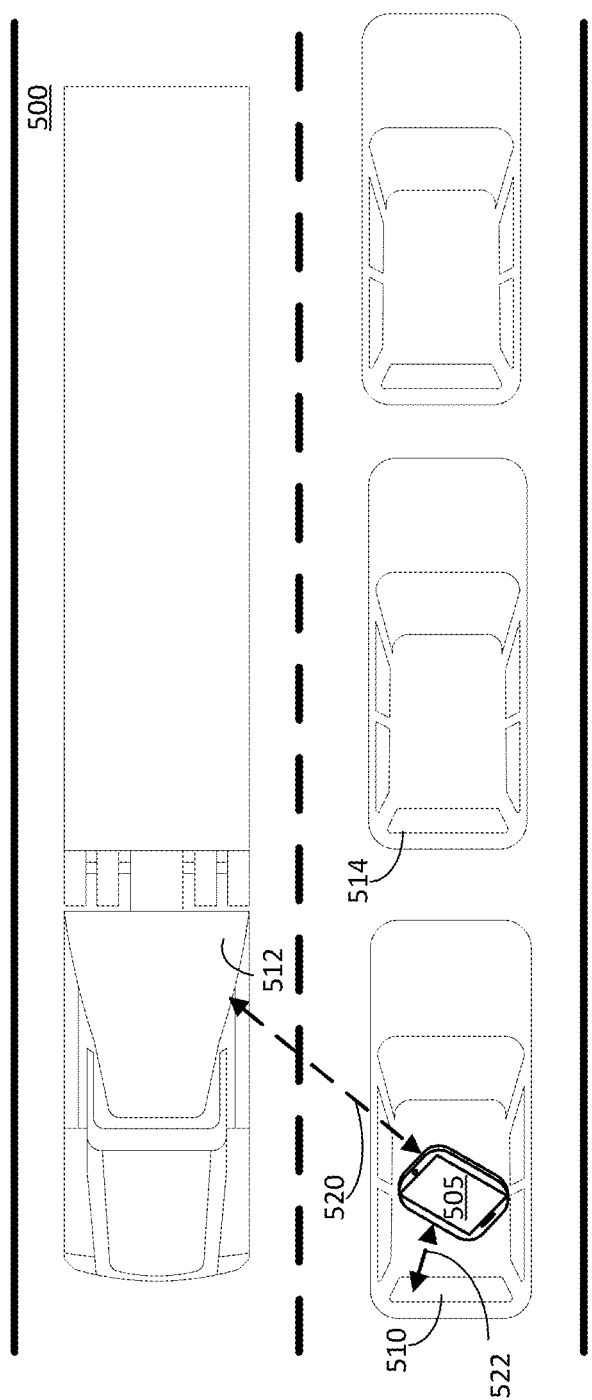
FIG. 5 is a top view of an example road environment.

FIG. 5 is a top view of a road environment 500 illustrating how WLAN sensing may be performed according to another embodiment. In the example illustrated in FIG. 5, a UE 505 located in a vehicle may detect the presence of other vehicles, such as a car 514 and/or a truck 512. It should be noted that in some embodiments, a vehicle itself may be equipped with WLAN sensing capabilities (e.g., WLAN sensing system as shown in and described above in connection with FIG. 3). In some such embodiments, the vehicle itself may perform the functionality described herein. As a specific example, portions of WLAN signals that travel along a WLAN signal path 520 may be transmitted by a transceiver of UE 505, reflected off of truck 512, and received by the transceiver of UE 505. The reflections may be identified in the captured WLAN sensing data, such as CSI, and used to determine the presence of truck 512. Presence of other vehicles may be used for various purposes, such as to detect traffic and/or estimate a level of traffic (e.g., based on an estimated vehicle density in road environment 500), to detect a dangerous driving pattern of the vehicle or of the other vehicles in road environment 500, or the like.

Additionally, as illustrated in FIG. 5, UE 505 may detect portions of a vehicle UE 505 is in, such as a back windshield 510 of the vehicle UE 505 is in, a side door or window, a front windshield, and/or any other suitable portion of the vehicle. As a specific example, portions of WLAN signals that travel along WLAN signal path 522 may be transmitted by a transceiver of UE 505, reflected off of back windshield 510, and received by the transceiver of UE 505. The reflections may be identified in the captured WLAN sensing data, such as CSI, and used to determine the presence of back windshield 510. Presence of portions of the vehicle UE 505 is in may be used for various purposes, such as to determine that UE 505 is inside a vehicle It should be noted that, in some embodiments, motion of an object (e.g., a person, a vehicle, an animal, or the like) may be detected by determining a change in successively-captured WLAN sensing data (e.g., from successive scans). Such changes may include, for example, a change in amplitude of CSI, phase of CSI, angle extracted from CSI, time of flight extracted from CSI, Doppler extracted from CSI, or any combination thereof. Furthermore, WLAN sensing data of WLAN signals having multiple spatial streams and/or relatively high bandwidth can be used to determine objects and/or smaller motions and/or finer detail then WLAN sensing data of WLAN signals having fewer spatial streams and/or relatively low bandwidth. In some embodiments, a velocity of motion (e.g., direction and/or speed) may additionally be estimated.

It should additionally be noted that, environmental characteristics may be determined based on WLAN sensing data. For example, in some embodiments, dimensions of an enclosed space (e.g., a room, a vehicle, or the like) a UE is in may be determined based on the WLAN sensing data. As another example, in some embodiments, a density of people or objects (e.g., buildings, plants, vehicles, or the like) may be determined based on the WLAN sensing data. Continuing with this example, in some embodiments, a location type may be identified based on a density of people or objects. As a more particular example, a determination that a UE is currently on a busy city street may be made in response to determining that a density of buildings exceeds a threshold. As another more particular example, a determination that a UE is currently at an event (e.g., a festival, a party, a concert, or the like) may be made in response to determining that a density of people exceeds a threshold. As yet another more particular example, a determination that a UE is currently in a vehicle in traffic may be made at least in part in response to determining that a density of vehicles exceeds a threshold.

Figure 6:
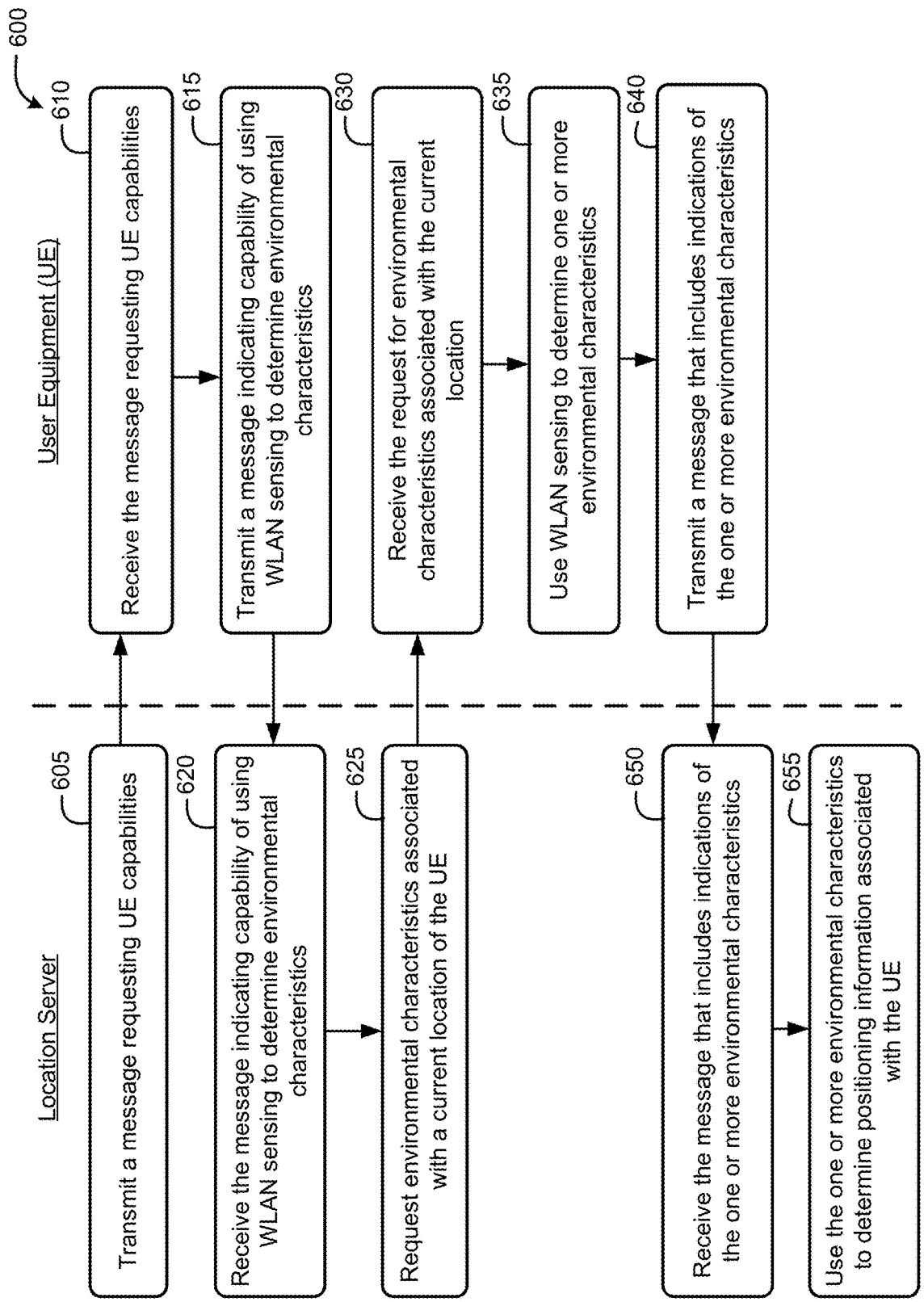
FIG. 6 is an information flow diagram of determining positioning information based on environmental characteristics of a UE, according to an embodiment.
Figure 9:
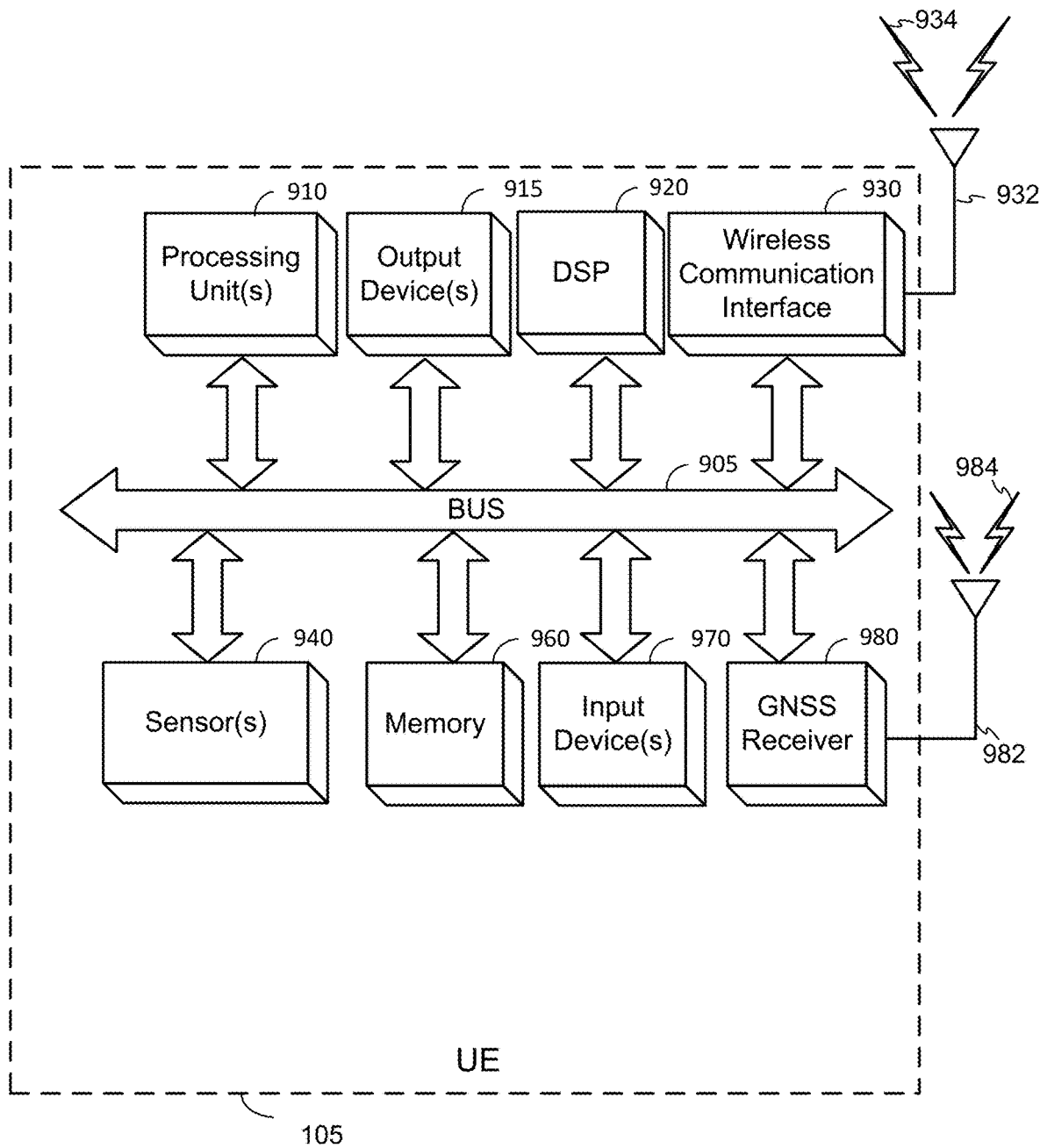
FIG. 9 is a block diagram of an embodiment of a UE, which can be utilized in embodiments as described herein.
Figure 10:
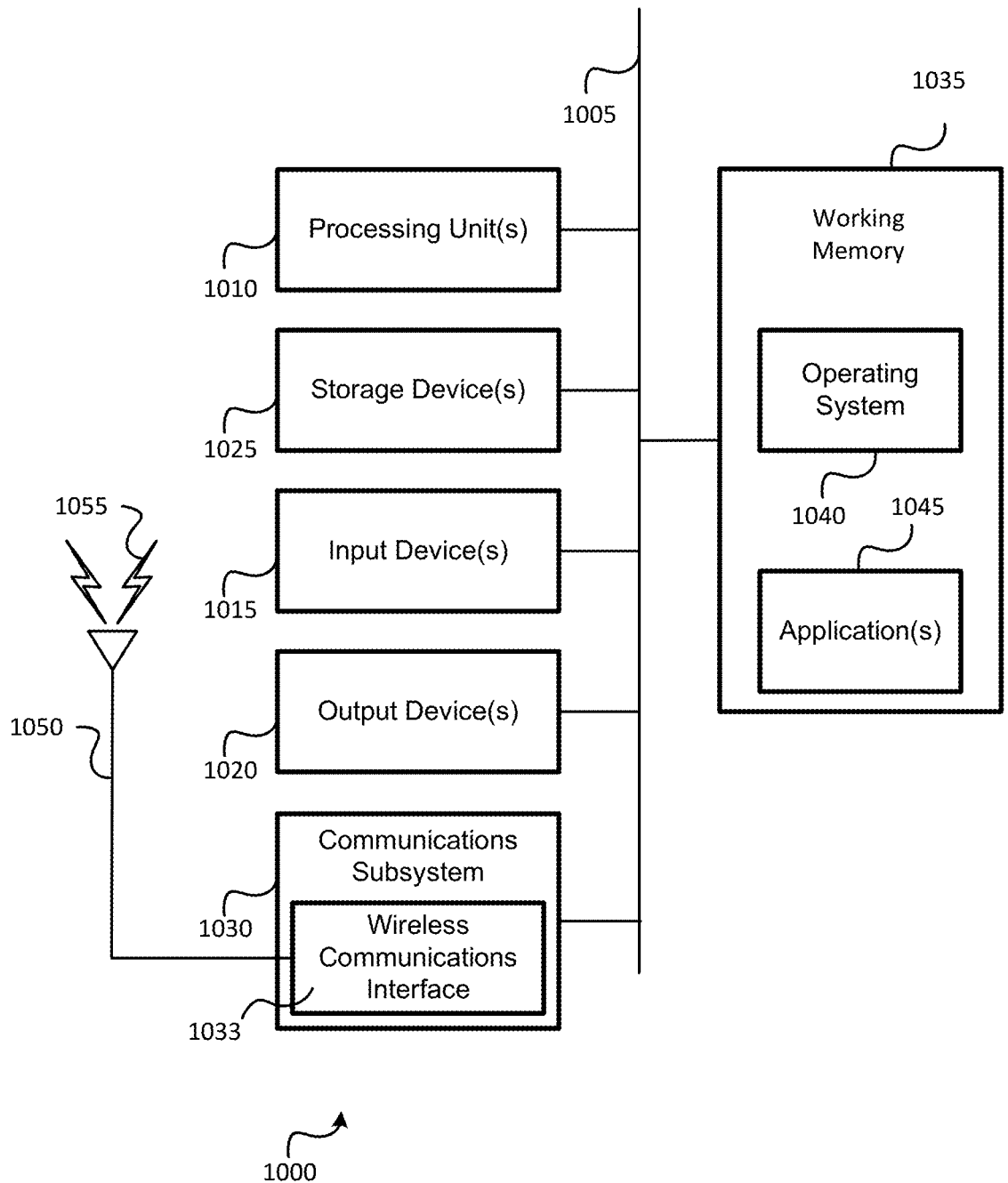
FIG. 10 is a block diagram of an embodiment of a computer system, which can be utilized in embodiments as described herein.

FIG. 6 is an information flow diagram of a method 600 of determining positioning information of a UE, according to an embodiment. Means for performing the functionality illustrated in one or more of the blocks shown in FIG. 6 may be performed by hardware and/or software components of a location server and/or a UE. Example components of a location server are illustrated in FIG. 10, which are described in more detail below. Example components of a UE are illustrated in FIG. 9, which are described in more detail below. The UE may comprise a WLAN sensing system, such as WLAN sensing system 300 shown in and described above in connection with FIG. 3.

It should be noted that exchanges between the UE and the location server as shown in FIG. 6 may be part of a positioning session between the location server and the UE. The positioning session may use any applicable protocol (e.g., LPP) to convey information.

At block 605, the functionality comprises a location server transmitting a request to a UE requesting UE capabilities. Means for performing the functionality at block 605 may comprise a processing unit of a location server, a wireless communications interface of a location server, and/or other components of a location server, as shown in FIG. 10.

The transmitted request may include a message requesting whether the UE is capable of performing WLAN sensing. In some embodiments, the transmitted request may include requesting whether the UE is capable of determining or inferring particular types of environmental characteristics. For example, the location server may request that the UE indicate whether the UE is capable of determining whether the UE is in an enclosed space, determining whether the UE is in motion, determining a density of people or objects around the vehicle, determining dimensions of an enclosed space in which the UE is currently located, or the like.

At block 610, the functionality comprises the UE receiving the message requesting UE capabilities. Means for performing the functionality at block 610 may comprise a processing unit of a UE, a wireless communication interface of a UE, and/or other components of a UE, as shown in FIG. 9.

In some embodiments, the UE may extract any suitable information from the message, such as an identifier of the location server, a timestamp of the message, or the like. The information may be extracted from one or more fields of the message.

At block 615, the functionality comprises the UE transmitting a message indicating a capability of the UE of using WLAN sensing to determine environmental characteristics. Means for performing the functionality at block 615 may comprise a processing unit of a UE, a wireless communication interface of a UE, and/or other components of a UE, as shown in FIG. 9.

The transmitted message may include indications of particular WLAN sensing capabilities of the UE. For example, the transmitted message may indicate that that the UE is capable of determining whether the UE is in an enclosed space, determining whether the UE is in motion, determining a density of people or objects around the vehicle, determining dimensions of an enclosed space in which the UE is currently located, or the like.

At block 620, the functionality comprises the location server receiving the message indicating a capability of the UE to use WLAN sensing to determine environmental characteristics. Means for performing the functionality at block 620 may comprise a processing unit of a location server, a wireless communication interface of a location server, and/or other components of a location server, as shown in FIG. 10.

In some embodiments, the location server may extract any suitable information from the message, such as one or more capabilities of the UE, an identifier of the UE, a current access point the UE is using, a timestamp of the message, or the like. The information may be extracted from one or more fields of the message.

At block 625, the functionality comprises the location server requesting environmental characteristics associated with a current location of the UE. Means for performing the functionality at block 625 may comprise a processing unit of the location server, a wireless communication interface of a location server, and/or other components of a location server, as shown in FIG. 10.

In some embodiments, the location server may request an environmental classification of a current environment of the UE. For example, the location server may request that the UE indicate whether a current environment of the UE corresponds to an enclosed space or an open space. As another example, the location server may request that the UE indicate whether the UE is currently in motion or is substantially still. As yet another example, the location server may request that the UE indicate whether the UE is currently in a high-density or low-density environment, where density may be with respect to people, or various different types of objects (e.g., vehicles, plants, buildings, or the like).

In some embodiments, the location server may request particular environmental characteristics that depend on the capabilities of the UE, as indicated in the message received at block 620. For example, in an instance in which the UE indicated that the UE is capable of determining dimensions of an enclosed space the UE is currently located in, the requested environmental characteristics may include an indication of whether or not the UE is currently in an enclosed space, and, if so, the dimensions of the enclosed space. As another example, in an instance in which the UE indicated that the UE is capable of determining a density of people or objects around the UE, the requested environmental characteristics may include an indication of the density of people or of various types of objects (e.g., vehicles, buildings, etc.) around the UE.

At block 630, the functionality comprises the UE receiving the request for environmental characteristics associated with the current location of the UE. Means for performing the functionality at block 630 may comprise a processing unit of a UE, a wireless communication interface of a UE, and/or other components of a UE, as shown in FIG. 9.

In some embodiments, the UE may extract any suitable information from the message, such as an identifier of the location server, a timestamp of the message, indications of particular requested environmental characteristics and/or classifications, or the like. The information may be extracted from particular fields of the message.

At block 635, the functionality comprises the UE using WLAN sensing to determine one or more environmental characteristics of the current location of the UE. Means for performing the functionality at block 635 may comprise a processing unit of a UE, a wireless communication interface of a UE, and/or other components of a UE, as shown in FIG. 9.

The UE may perform WLAN sensing as described above in connection with FIGS. 3, 4A, 4B, and/or 5. For example, in some embodiments, as shown in and described above in connection with FIG. 4A, the UE may transmit one or more WLAN signals and may receive one or more WLAN signals that have reflected off of one or more objects in the environment (e.g., walls, furniture, vehicles, people, plants, or the like). The reflections may be identified in captured WLAN data (e.g., CSI data, as described above in connection with FIG. 3). The UE may then determine one or more environmental classifications and/or one or more environmental characteristics using the CSI data, as described below in more detail in connection with FIG. 7.

At block 640, the functionality comprises the UE transmitting a message that includes indications of the one or more environmental characteristics and/or one or more environmental classifications to the location server. Means for performing the functionality at block 640 may comprise a processing unit of a UE, a wireless communication interface of a UE, and/or other components of a UE, as shown in FIG. 9.

In some embodiments, the UE may transmit the indications of the one or more environmental characteristics and/or one or more environmental classifications in an LPP message. For example, in some embodiments, a particular environmental characteristics or environmental classification may be indicated within a particular field or parameter of the LPP message. As a more particular example, a first particular field may correspond to an indication of whether the UE is currently in an enclosed space or in an open space. Continuing with this particular example, the UE may set values of the first particular field in accordance with the determination by the UE at block 635 of whether or not the UE is currently in an enclosed space. It should be noted that indications of the one or more environmental characteristics and/or one or more environmental classifications may be transmitted in connection with any other suitable type of message (e.g., as values of particular fields of the message). For example, it should be understood that, in some embodiments, messages associated with other positioning protocols may be used.

It should be noted that fields or parameters of an LPP message may be standardized. For example, particular fields or parameters may be designated for indicating particular types of environmental classifications and/or particular types of environmental characteristics.

At block 650, the functionality comprises the location server receiving the message that includes indications of the one or more environmental characteristics. Means for performing the functionality at block 650 may comprise a processing unit of a location server, a wireless communication interface of a location server, and/or other components of a location server, as shown in FIG. 10.

The location server may extract any suitable information from the message, such as an identifier of the UE, a timestamp of the message, one or more environmental characteristics associated with a current location of the UE. The one or more environmental characteristics associated with the current location of the UE may be extracted from one or more fields of the message.

At block 655, the functionality comprises the location server using the one or more environmental characteristics to determine positioning information associated with the UE. Means for performing the functionality at block 655 may comprise a processing unit of a location server, and/or other components of a location server, as shown in FIG. 10.

In some embodiments, the location server may utilize various techniques to determine the positioning information associated with the UE. For example, in some embodiments, the location server may configure assistance data based on the environmental characteristics and/or the environmental classification that allow the location server to more accurately and/or quickly determine a current location of the UE. As a more particular example, in an instance in which the environmental characteristics and/or the environmental classifications indicate that the UE is currently in a building, the location server may determine that the UE is unlikely to be within a LOS to a wireless cellular base station (e.g., an eNodeB, a gNodeB, or the like), and may responsively configured the assistance data to rely on or incorporate indoor positioning source measurements. As another more particular example, in an instance in which the environmental characteristics indicate that the UE is currently in motion, the location server may configure the assistance data to instruct the UE to measure PRS signals more frequently than the UE otherwise would.

In some embodiments, the location server may perform other actions based on the environmental characteristics and/or the environmental classifications, as shown in and described below in connection with FIG. 8.

Figure 7:
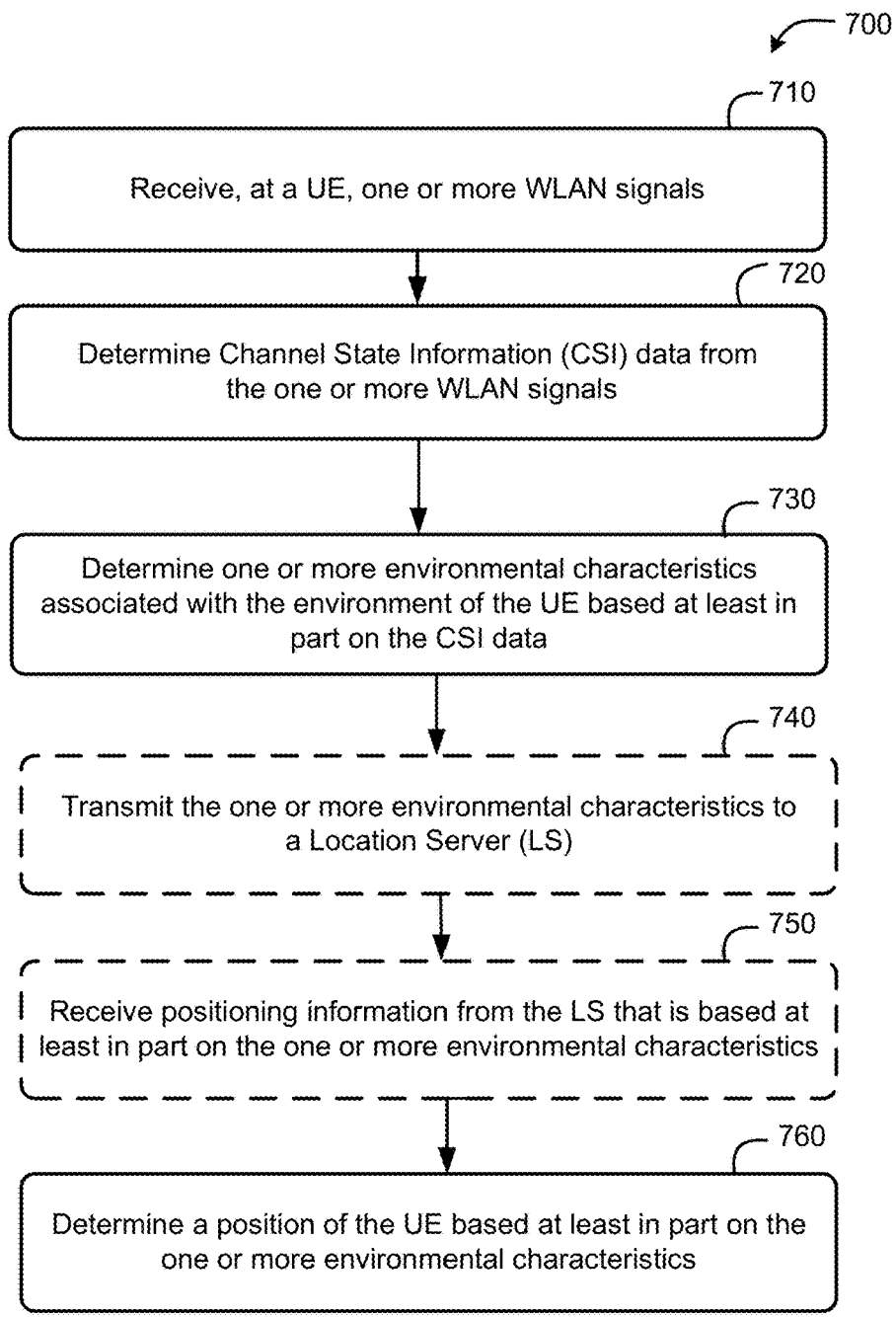
FIG. 7 is a flow diagram of determining a position of a UE, according to an embodiment.

FIG. 7 is a flow diagram of a method 700 of determining a position of a UE, according to an embodiment. Means for performing the functionality illustrated in one or more of the blocks shown in FIG. 7 may be performed by hardware and/or software components of a UE. Example components of a UE are illustrated in FIG. 9, which are described in more detail below. The UE may comprise a WLAN sensing system, such as WLAN sensing system 300 shown in and described above in connection with FIG. 3.

At block 710, the functionality comprises receiving, at a UE, one or more WLAN signals. Means for performing the functionality of block 710 may comprise a wireless communications interface of a UE, and/or other components of a UE, as shown in FIG. 9.

The UE may receive the WLAN signals at one or more antennas of the UE. The received WLAN signals may indicate reflections off of various surfaces or objects in an environment the UE is currently located in. For example, as shown in and described above in connection with FIGS. 4A and 4B, the reflections may be reflections off of surfaces or objects in a room environment, such as furniture, plants, walls, or the like. As another example, as shown in and described above in connection with FIG. 5, the reflections may be reflections off a surface or objects in a road environment, such as a vehicle the UE is currently in, other vehicles in the road environment, traffic control equipment (e.g., stoplights, signs, construction barriers, or the like), pedestrians, or the like. Other examples of surfaces or objects from which reflections may be indicated in the received WLAN signals include: people (e.g., adults, children, etc.), building surfaces (e.g., exterior walls, interior walls, windows, door frames, awnings, balcony or patio walls, or the like), plants, decorative objects (e.g., balloons, signs, or the like), and/or other objects or surfaces in the environment.

It should be noted that the reflections may be reflections from one or more transmitted WLAN signals. The one or more transmitted WLAN signals may have been transmitted by the UE itself. Additionally or alternatively, the one or more transmitted WLAN signals may have been transmitted by a different device (e.g., a different device in a vicinity of the UE), such as an access point, another UE, a transceiver of a smart device (e.g., a smart television, a smart appliance, or the like), and/or any other suitable device capable of transmitting WLAN signals.

At 720, the functionality comprises determining CSI data from the one or more WLAN signals. The means for performing the functionality may comprise a processing unit of a UE, and/or other components of a UE, as shown in FIG. 9.

As described above in connection with FIG. 3, the CSI data may indicate travel paths of WLAN signals, and may therefore indicate reflections off of various surfaces or objects in the environment of the UE. For example, the CSI data may be a 3D matrix that represents information such as amplitude attenuation, phase shift, or the like, of multipath WLAN signals.

In some embodiments, the CSI data may be pre-processed to, for example, reduce or filter out noise in the CSI data, identify signals of interest, or the like. For example, noise may be removed using a filter, such as a moving average filter, an exponentially weighted moving average filter, a low pass filter, or the like. As another example, in some embodiments, anomalous data may be identified and/or removed an anomaly detection classifier or the like.

At 730, the functionality comprises determining one or more environmental characteristics associated with an environment of the UE based at least in part on the CSI data. In some embodiments, the environmental characteristics may be determined based at least in part on pre-processed CSI data. The means for performing the functionality may comprise a processing unit of a UE, and/or other components of a UE, as shown in FIG. 9.

In some embodiments, the one or more environmental characteristics may include one or more environmental classifications. Examples of the one or more classifications include whether the UE is in an enclosed space or in an open space, whether the UE is in motion or is not in motion (e.g., is substantially still), whether the UE is in a high-density environment or a low-density environment (e.g., a high density of people or a low density of people, a high density of buildings or a low density of buildings, a high density of vehicles or a low density of vehicles, etc.), or the like.

The one or more classifications may be determined using a trained machine learning model, such as a trained classifier. Example machine learning model architectures that may be used include a regression model (e.g., a logistic regression), a support vector machine, a deep neural network (e.g., a convolutional neural network, or the like), an unsupervised classifier (e.g., a K-nearest neighbors algorithm), or the like. In some embodiments, a machine learning model may be trained on a server or other computing device, and coefficients or other parameters associated with the trained machine learning model may be transmitted to the UE and stored on the UE for use during inference time. In some embodiments, the UE may store coefficients or parameters associated with multiple trained machine learning models, for example, each corresponding to a different classification category. For example, in some embodiments, a first machine learning model may be used to classify the environment as an enclosed space or an open space, and a second machine learning model may be used to classify the UE as in motion or not in motion.

In some embodiments, the environmental characteristics may include dimensions of an enclosed space the UE is in (e.g., a height, width, or length of a room). In some embodiments, the environmental characteristics may include information indicating a material of walls or other surfaces in the environment (e.g., that a particular wall is made of wood, concrete, or the like). In some embodiments, the environmental characteristics may include an estimate of a density or an estimate of a number of a particular type of object in the environment, such as a number of people, vehicles, plants, buildings, or the like, in the environment. In some embodiments, the environmental characteristics may indicate information about particular types of objects in the environment. For example, in an instance in which the UE determines that there are people in the environment, the UE can additionally determine environmental characteristics that indicate information about the demographics of the people in the environment based on the CSI data, such as a distribution of adults to children (e.g., based on estimated heights of the people in the environment determined based on the CSI data). As another example, in an instance in which the UE determines that there are vehicles in the environment, the UE can additionally determine whether the vehicles are in motion or are substantially still.

In some embodiments, the environmental characteristics may include an identification of a particular landmark or milestone in the environment of the current location of the UE. Examples of landmarks or milestones include street signs, identifications of particular buildings, identifications of particular statues, identifications, or the like. An identification of a particular landmark or milestone may be made by the UE by comparing the CSI data to a database (e.g., stored in memory of the UE) of known landmarks or milestones. In some embodiments, the environmental characteristics may additionally include a distance (e.g., in meters) to the identified landmark or milestone.

In some embodiments, the environmental characteristics may include an inference of a location or a type of location the UE is currently in. For example, in response to determining that the environmental characteristics indicate that the UE is currently in an environment with a density of people that exceeds a predetermined density threshold, the UE can determine that the UE is at an event (e.g., a concert, a festival, or the like). As another example, in response to determining that the environmental characteristics indicate that the UE is currently in an environment with a density of plants that exceeds a predetermined density threshold, the UE can determine that the UE is in a garden, forest, or the like. As yet another example, in response to determining that the environmental characteristics indicate that the UE is currently in an environment with a density of vehicles that exceeds a predetermined threshold, and that the vehicles are substantially still, the UE can determine that the UE is currently in traffic, in a parking lot, or the like.

In some embodiments, the environmental characteristics may be determined using one or more trained machine learning models. Examples of machine learning model architectures that may be used include neural networks (e.g., deep neural networks, such as convolution neural network, or the like), linear and/or logistic regressions, support vector machines, and/or any other suitable type of machine learning algorithm or combination thereof. In some embodiments, a machine learning model may be trained on a server or other computing device, and coefficients or parameters associated with the trained machine learning model may be transmitted to the UE for use by the UE at inference time.

At 740, the functionality comprises transmitting indications of the one or more environmental characteristics to a location server. Means for performing the functionality may comprise a processing unit of a UE, a wireless communication interface of a UE, and/or other components of a UE, as shown in FIG. 9.

As described above in connection with block 640 of FIG. 6, the indications of the one or more environmental characteristics may be transmitted to the location server within a message, such as an LPP message. For example, the one or more environmental characteristics may be indicated within particular fields or parameters of an LPP message. In some implementations, the location server may determine a location of the UE based, at least in part, on the one or more environmental characteristics At 750, the functionality comprises receiving positioning information from the location server that is based at least in part on the one or more environmental characteristics. Means for performing the functionality may comprise a processing unit of a UE, a wireless communication interface of a UE, and/or other components of a UE, as shown in FIG. 9.

In some embodiments, in an instance in which UE-based positioning is being performed, the positioning information may include assistance data that has been configured by the location server based on the one or more environmental characteristics transmitted to the location server at block 740. For example, the assistance data may include configuration instructions that cause the UE to measure PRS more frequently in response to the one or more environmental characteristics indicating that the UE is in motion and/or is in motion with a velocity greater than a threshold velocity.

Techniques for configuring assistance data by a location server are described below in connection with FIG. 8.

It should be noted that, in some embodiments, blocks 740 and/or 750 may be omitted. For example, in some embodiments, a UE may determine a position of the UE based on the one or more environmental characteristics without receiving positioning information (e.g., assistance data) from the location server. In some such instances, the UE may not transmit the one or more environmental characteristics to the location server at block 740 and may not receive positioning information from the location server at block 750.

At block 760, the functionality comprises determining a position of the UE based at least in part on the one or more environmental characteristics. Means for performing the functionality of block 760 may comprise a processing unit of a UE, and/or other components of a UE, as shown in FIG. 10.

In some embodiments, the UE may determine the position of the UE based on the positioning information received from the location server at block 750, where the positioning information was determined by the location server based on the one or more environmental characteristics. For example, in instances in which UE-based positioning is being performed, the UE may determine the position of the UE based on assistance data that has been configured by the location server based on the one or more environmental characteristics of the environment of the UE.

In some embodiments, in instances in which UE-based positioning is being performed, the UE may select particular sources of positioning information based on the one or more environmental characteristics. For example, the UE may select particular devices (e.g., base stations, small cells, other UEs, or the like) from which PRS data is measured based on one or more environmental characteristics that indicate line of sight information. As another example, in an instance in which the one or more environmental characteristics indicate that the UE is in an enclosed space, the UE may determine positioning information based on particular small cells or integrated access and backhaul (IAB) nodes. Continuing with this example, in an instance in which the one or more environmental characteristics indicate that the UE is in an open or unenclosed space, the UE may ignore information from the small cells or IAB nodes.

In some embodiments, the UE may determine the position of the UE by inferring or determining the position or location of the UE based on the one or more environmental characteristics. For example, in some embodiments, the UE may use an inferred type of location associated with the current environment of the UE and/or a position estimate of the UE to determine the position of the UE. As a more particular example, in some embodiments, the UE may query a database with information such as the inferred type of location and/or the position estimate of the UE to determine the position of the UE. As a specific example, in an instance in which the inferred type of location is a garden (e.g., a botanical garden, a garden area in a park, etc.), the UE may query a database to identify a position corresponding to a garden area near the estimated position. In some embodiments, a database may be stored in local memory of the UE.

It should be noted that, in some embodiments, the UE may perform various other actions based on the one or more environmental characteristics. For example, in some embodiments, in response to determining, based on the one or more environmental characteristics that the UE is in a motion and is therefore associated with a vehicle (e.g., in a vehicle), the UE can cause a Vehicle-to-Everything (V2X) communication mode to be invoked, thereby allowing the communication with other device in a road environment (e.g., other vehicles, traffic control device sensors, etc.).

Figure 8:
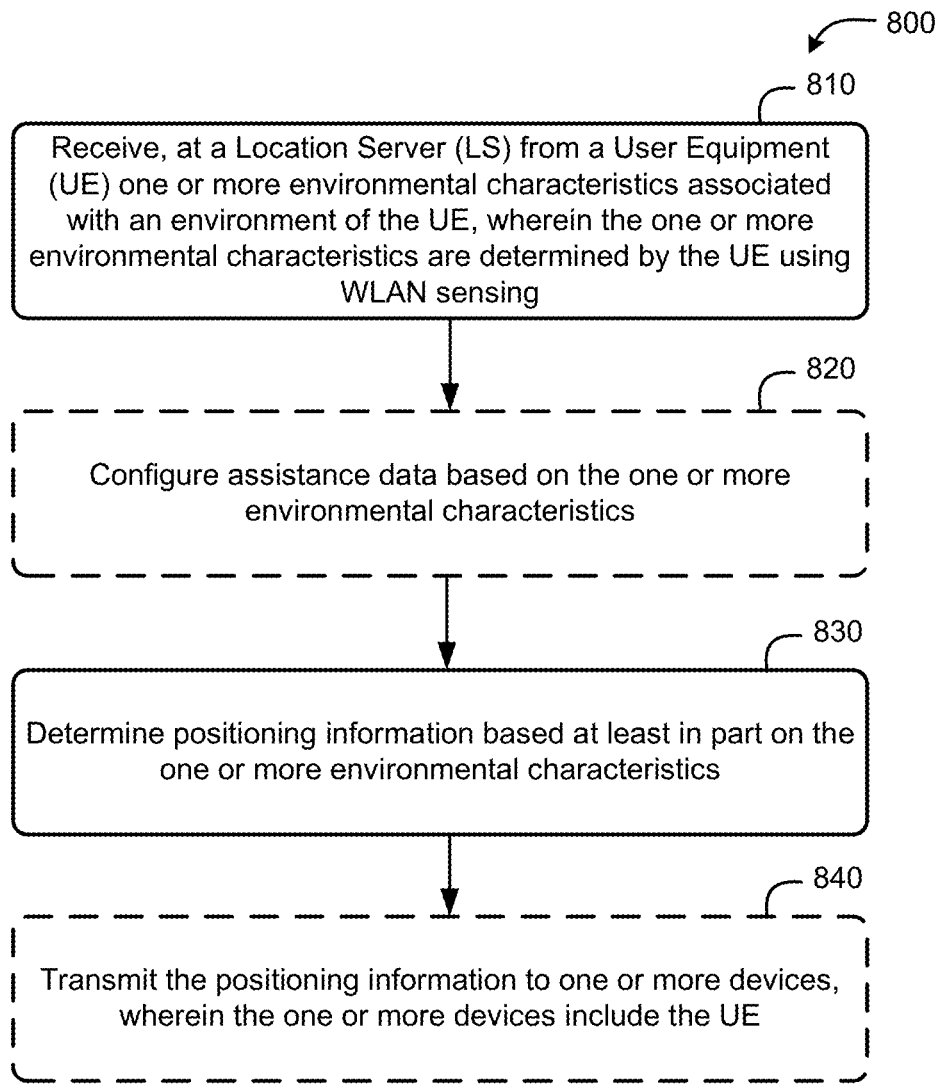
FIG. 8 is a flow diagram of determining positioning information by a Location Server (LS), according to an embodiment.

FIG. 8 is a flow diagram of a method 800 of determining positioning information by an LS, according to an embodiment. Means for performing the functionality illustrated in one or more of the blocks shown in FIG. 8 may be performed by hardware and/or software components of a location server. Example components of a location server are illustrated in FIG. 10, which are described in more detail below.

At block 810, the functionality comprises receiving, at a location server, from a UE, one or more environmental characteristics associated with a current environment of the UE, where the one or more environmental characteristics are determined by the UE using WLAN sensing. Means for performing the functionality of block 810 may comprise one or more processing units of a location server, a wireless communication interface of a location server, and/or other components of the location server, as shown in FIG. 10.

As described above in connection with block 730 of FIG. 7, the one or more environmental characteristics may include one or more environmental classifications of the current environment of the UE. The one or more environmental classifications may include whether the UE is in an enclosed space or an open space, whether the UE is in motion or is substantially still, whether the UE is in a high-density environment or in a low-density environment, or the like. As described above in connection with block 730 of FIG. 7, the one or more environmental characteristics may include dimensions of an enclosed space of the environment of the UE, an identification of one or more physical landmarks or milestones in the environment, an estimate of a number of people or objects (e.g., vehicles, buildings, plants, etc.) in the environment, a demographic distribution of people in the environment (e.g., an estimated ratio of children to adults in the environment), or the like. In some embodiments, the one or more environmental characteristics may include an inferred type of location of the UE Example types of location include a garden or park, inside a building, a parking lot, on a highway, or the like.

As described above in connection with block 740 of FIG. 7, the one or more environmental characteristics may be received in a message, such as an LPP or NRPP message. For example, the one or more environmental characteristics may be indicated in one or more fields of an LPP message.

At block 820, which is optional, the functionality comprises configuring assistance data based on the one or more environmental characteristics. Means for performing the functionality may comprise a processing unit of a location server, and/or other components of a location server, as shown in FIG. 10.

In some embodiments, the assistance data may be configured to alter a weighting of sources of information used to determine a position of the UE. For example, in some embodiments, in an instance in which the one or more environmental characteristics indicate that the UE is in an enclosed space (and may therefore not have a LOS to wireless cellular base stations for GNSS-based positioning), the assistance data may be configured to instruct the UE to use indoor positioning information for determining a position of the UE. In some embodiments, the assistance data may be configured to instruct the UE to measure PRS signals more frequently, for example, in response to receiving environmental characteristics that indicate that the UE is in motion and/or is in motion with a velocity above a predetermined velocity threshold.

At block 830, the functionality comprises determining positioning information based at least in part on the one or more environmental characteristics. Means for performing the functionality may comprise a processing unit of a location server, and/or other components of a location server, as shown in FIG. 10.

In some embodiments, the positioning information may comprise assistance data (e.g., as determined at block 820), for example, in an instance in which UE-based positioning is being performed. In some embodiments, such as in instances in which UE-assisted positioning is being performed, the positioning information may include a determined position of the UE that is based on the environmental characteristics received from the UE. For example, in some embodiments, the location server may determine the position of the UE by adjusting an estimated position of the UE using the one or more environmental characteristics to determine a more accurate position of the UE. As a more particular example, in an instance in which the one or more environmental characteristics indicate that the UE is in an enclosed space, the location server may determine a position of the UE by identifying a location of an enclosed space within proximity to the estimated position.

In some embodiments, the positioning information may comprise a determination of a location that corresponds to the one or more environmental characteristics. For example, in an instance in which the one or more environmental characteristics indicate that a high density of people, the positioning information may include an indication of a location currently hosting a gathering of people (e.g., a location of a concert, festival, or other event). Such a location may be identified using various sources of information, such as location data associated with multiple other UEs in the vicinity of the gathering, calendar information, or the like.

At block 840, which is optional, the functionality comprises transmitting the positioning information to one or more devices, wherein the one or more devices include the UE. Means for performing the functionality may comprise a processing unit of a location server, a wireless communication interface of a location server, and/or other components of a location server, as shown in FIG. 10.

In some embodiments, such as in instances in which UE-based positioning is being performed, the positioning information may comprise configured assistance data that is transmitted to the UE and/or a position of the UE that has been determined based on the one or more environmental characteristics.

In some embodiments, such as in instances in which UE-assisted positioning is being performed, the positioning information may be transmitted to devices other than the UE. For example, the positioning information may be transmitted to one or more other UEs that have requested a position of the UE. In some embodiments, the requested position may be requested in connection with a "Device Finder" or "Friend Finder" application. As another example, the positioning information may be transmitted to a device (e.g., a web server or external client) associated with emergency services, for example, to indicate a probable location or position of a lost child.

FIG. 9 illustrates an embodiment of a UE 105, which can be utilized as described herein above (e.g., in association with FIGS. 3-7 and/or 11. For example, the UE 105 can perform one or more of the functions of the methods shown in FIGS. 6, 7, and/or 11. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 9.

The UE 105 is shown comprising hardware elements that can be electrically coupled via a bus 905 (or may otherwise be in communication, as appropriate). The hardware elements may include a processing unit(s) 910 which can include without limitation one or more general-purpose processors, one or more special-purpose processors (such as digital signal processor (DSP) chips, graphics acceleration processors, application specific integrated circuits (ASICs), and/or the like), and/or other processing structures or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below). The UE 105 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The UE 105 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a WLAN device (e.g., a Wi-Fi device), a WiMAX device, a WAN device, and/or various cellular devices, etc.), and/or the like, which may enable the UE 105 to communicate with other devices as described in the embodiments above. It should be noted that wireless communication interface 930 may be capable of performing the WLAN sensing described herein. The wireless communication interface 930 may comprise WLAN sensing system 305 of FIG. 3. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a GNSS receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 105, using conventional techniques, from GNSS satellites 110 of a GNSS system, such as GPS, Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 910, DSP 920, and/or a processing unit within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 910 or DSP 920.

The UE 105 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 105 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 105 (and/or processing unit(s) 910 or DSP 920 within UE 105). In an aspect, then such code and/or instructions can be used to configure and/or adapt a general-purpose computer (or other device) to perform one or more operations in accordance with the described methods.

FIG. 10 is a block diagram of an embodiment of a computer system 1000, which may be used, in whole or in part, to provide the functions of one or more network components as described in the embodiments herein (e.g., location server 160 of FIGS. 1, 6, and/or 8. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner. In addition, it can be noted that components illustrated by FIG. 10 can be localized to a single device and/or distributed among various networked devices, which may be disposed at different geographical locations.

The computer system 1000 is shown comprising hardware elements that can be electrically coupled via a bus 1005 (or may otherwise be in communication, as appropriate). The hardware elements may include processing unit(s) 1010, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1000 also may comprise one or more input devices 1015, which may comprise without limitation a mouse, a keyboard, a camera, a microphone, and/or the like; and one or more output devices 1020, which may comprise without limitation a display device, a printer, and/or the like.

The computer system 1000 may further include (and/or be in communication with) one or more non-transitory storage devices 1025, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1000 may also include a communications subsystem 1030, which may comprise wireless communication technologies managed and controlled by a wireless communication interface 1033, as well as wired technologies (such as Ethernet, coaxial communications, universal serial bus (USB), and the like). The wireless communication interface 1033 may send and receive wireless signals 1055 (e.g., signals according to 5G NR or LTE) via wireless antenna(s) 1050. Thus the communications subsystem 1030 may comprise a modem, a network card (wireless or wired), an infrared communication device, a wireless communication device, and/or a chipset, and/or the like, which may enable the computer system 1000 to communicate on any or all of the communication networks described herein to any device on the respective network, including a User Equipment (UE), base stations and/or other TRPs, and/or any other electronic devices described herein. Hence, the communications subsystem 1030 may be used to receive and send data as described in the embodiments herein.

In many embodiments, the computer system 1000 will further comprise a working memory 1035, which may comprise a RAM or ROM device, as described above. Software elements, shown as being located within the working memory 1035, may comprise an operating system 1040, device drivers, executable libraries, and/or other code, such as one or more applications 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1025 described above. In some cases, the storage medium might be incorporated within a computer system, such as computer system 1000. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

Figure 11:
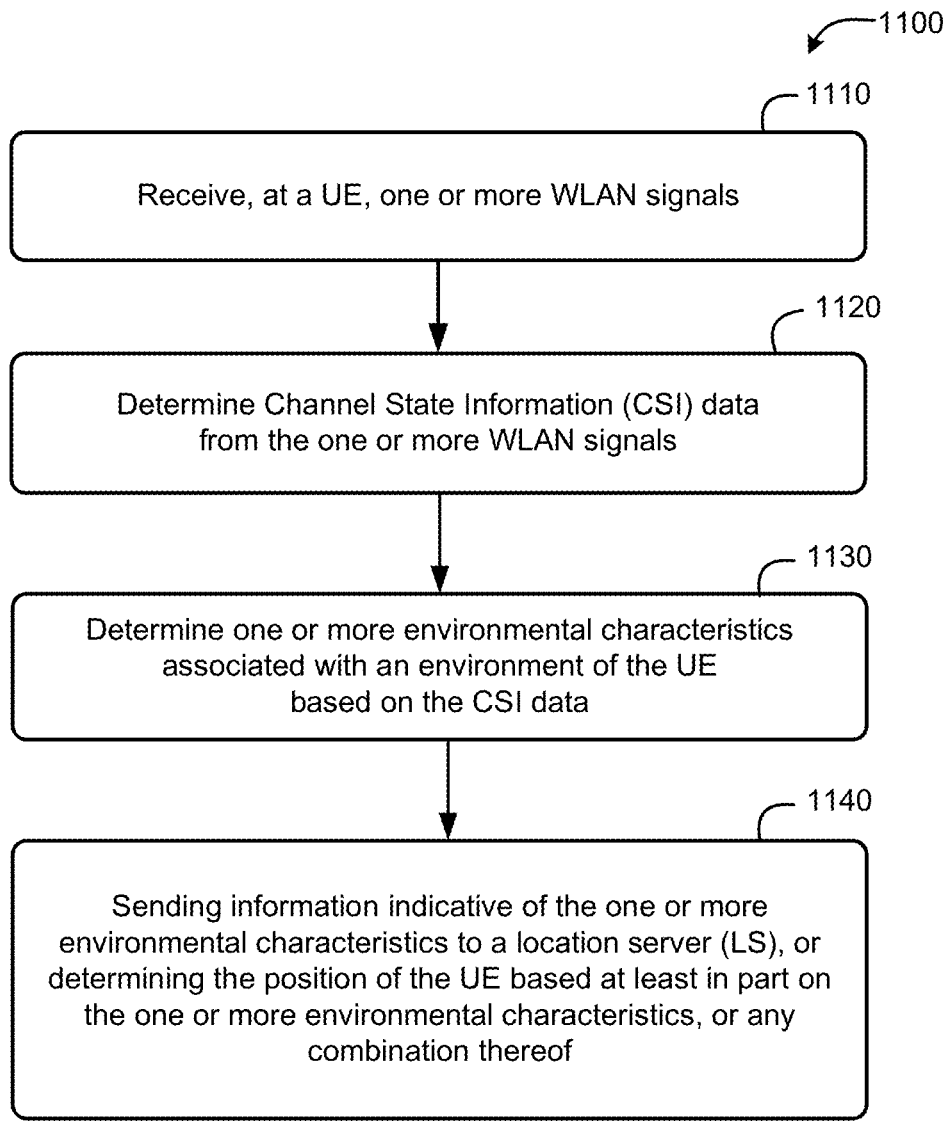
FIG. 11 is a flow diagram of determining a position of a UE, according to an embodiment.

FIG. 11 shows a flow diagram of a method 1100 for determining a position of a UE, according to an embodiment. Means for performing the functionality illustrated in one or more of the blocks shown in FIG. 11 may be performed by hardware and/or software components of a UE. Example components of a UE are illustrated in FIG. 9, which are described in more detail above. The UE may comprise a WLAN sensing system, such as WLAN sensing system 300 shown in FIG. 3.

At block 1110, the functionality comprises receiving, at a UE, one or more WLAN signals. Means for performing the functionality of block 1110 may comprise a processing unit of a UE, one or more wireless communication interfaces of a UE, and/or one or more components of a UE, as shown in FIG. 9.

The WLAN signals may indicate reflections from one or more surfaces or objects in a current environment of the UE. Examples of surfaces or objects may include walls of a room or building, furniture, people, animals, plants, vehicles, outdoor objects (e.g., traffic equipment, construction equipment, signs, etc.), or the like.

The WLAN signals may be received by one or more antennas of the UE. In some embodiments, the WLAN signals may be reflections of one or more WLAN signals that were transmitted by the UE. Additionally or alternatively, in some embodiments, the WLAN signals may be reflections of one or more WLAN signals that were transmitted by a device other than the UE (e.g., transmitted by an access point, transmitted by another UE in the vicinity, or the like).

At block 1120, the functionality comprises determining CSI data from the one or more WLAN signals. Means for performing the functionality of block 1120 may comprise one or more processing units of a UE, and/or other components of a UE, as shown in FIG. 9.

As described above in connection with FIG. 3, the CSI data may indicate travel paths of WLAN signals, and may therefore indicate reflections off of various surfaces or objects in the environment of the UE. For example, the CSI data may be a 3D matrix that represents information such as amplitude attenuation, phase shift, or the like, of multipath WLAN signals.

At block 1130, the functionality comprises determining one or more environmental characteristics associated with an environment of the UE based on the CSI data. Means for performing the functionality may comprise a processing unit of a UE, a memory of a UE, and/or other components of a UE, as shown in FIG. 9.

As described above in connection with block 730 of FIG. 7, the one or more environmental characteristics may include one or more environmental classifications associated with the environment of the UE. For example, the one or more environmental classifications may include whether the UE is in an enclosed space or an open space, whether the UE is in motion or is substantially still, whether the UE is in a high-density or low-density environment, or the like. As described above in connection with block 730 of FIG. 7, the one or more environmental characteristics may include dimensions of an enclosed space of the UE, identifications of one or more landmarks or milestones in the environment, an estimate of a number of people or objects (e.g., vehicles, plants, buildings, or the like) present in the environment, or the like. As described above in connection with block 730 of FIG. 7, the one or more environmental characteristics may include an inferred type of location of the UE.

The one or more environmental characteristics may be determined by using the CSI data, and/or a portion of the CSI data, as an input to one or more trained machine learning models that generate one or more outputs corresponding to one or more environmental characteristics. In some embodiments, parameters (e.g., coefficients) associated with a trained machine learning model may be stored in memory of the UE.

At block 1140, the functionality comprises sending information indicative of the one or more environmental characteristics to an LS, or determining the position of the UE based at least in part on the one or more environmental characteristics, or any combination thereof. Means for performing the functionality of block 1140 may comprise a processing unit of a UE, a wireless communication interface of a UE, a memory of a UE, and/or other components of a UE, as shown in FIG. 9.

In some embodiments, such as in instances in which UE-based positioning is being performed, the UE may determine the position based on positioning information received from a location server, as described above in connection with FIG. 8. For example, the positioning information may include assistance data configured by the location server based on the one or more environmental characteristics. Continuing with this example, the assistance data may cause the UE to determine the position using indoor positioning information, may cause the UE to measure PRS signals more frequently, or the like.

In some embodiments, the UE may determine the position by querying a database using the one or more environmental characteristics. For example, in an instance in which the one or more environmental characteristics include an identification of a particular landmark or milestone in the environment, the UE may query the database using the identified landmark or milestone. Continuing with this example, the UE may retrieve, from the database, the location of the landmark or milestone. The UE may then determine the position by adjusting the location of the landmark or milestone based on a distance of the UE to the location or milestone. In some embodiments, the database may be stored in local memory of the UE.

Figure 12:
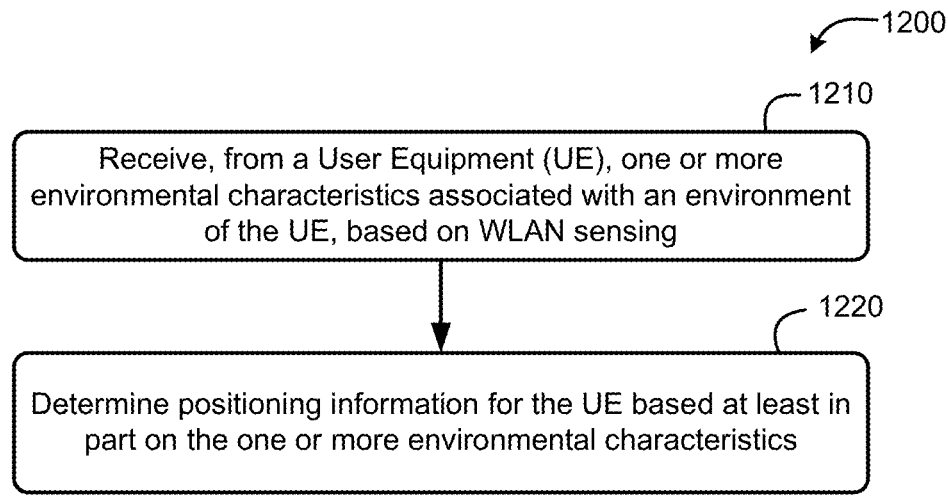
FIG. 12 is a flow diagram for determining positioning information by an LS, according to an embodiment.

FIG. 12 is a flow diagram of a method 1200 of determining positioning information by an LS, according to an embodiment. Means for performing the functionality illustrated in one or more of the blocks shown in FIG. 12 may be performed by hardware and/or software components of a location server. Example components of a location server are illustrated in FIG. 10, which are described in more detail below.

At block 1210, the functionality comprises receiving, from a UE, one or more environmental characteristics associated with an environment of the UE, based on WLAN sensing. Means for performing the functionality of block 1210 may comprise one or more processing units of a location server, a wireless communication interface of a location server, and/or other components of the location server, as shown in FIG. 10.

As described above in connection with block 730 of FIG. 7, the one or more environmental characteristics may include one or more environmental classifications of the current environment of the UE. The one or more environmental classifications may include whether the UE is in an enclosed space or an open space, whether the UE is in motion or is substantially still, whether the UE is in a high-density environment or in a low-density environment, or the like. As described above in connection with block 730 of FIG. 7, the one or more environmental characteristics may include dimensions of an enclosed space of the environment of the UE, an identification of one or more physical landmarks or milestones in the environment, an estimate of a number of people or objects (e.g., vehicles, buildings, plants, etc.) in the environment, a demographic distribution of people in the environment (e.g., an estimated ratio of children to adults in the environment), or the like. In some embodiments, the one or more environmental characteristics may include an inferred type of location of the UE Example types of location include a garden or park, inside a building, a parking lot, on a highway, or the like.

As described above in connection with block 740 of FIG. 7, the one or more environmental characteristics may be received in a message, such as an LPP or NRPP message. For example, the one or more environmental characteristics may be indicated in one or more fields of an LPP message.

At block 1220, the functionality comprises determining positioning information for the UE based at least in part on the one or more environmental characteristics. Means for performing the functionality may comprise a processing unit of a location server, and/or other components of a location server, as shown in FIG. 10.

In some embodiments, the positioning information may comprise assistance data, for example, in an instance in which UE-based positioning is being performed. In some embodiments, such as in instances in which UE-assisted positioning is being performed, the positioning information may include a determined position of the UE that is based on the environmental characteristics received from the UE. For example, in some embodiments, the location server may determine the position of the UE by adjusting an estimated position of the UE using the one or more environmental characteristics to determine a more accurate position of the UE. As a more particular example, in an instance in which the one or more environmental characteristics indicate that the UE is in an enclosed space, the location server may determine a position of the UE by identifying a location of an enclosed space within proximity to the estimated position.

In some embodiments, the positioning information may comprise a determination of a location that corresponds to the one or more environmental characteristics. For example, in an instance in which the one or more environmental characteristics indicate that a high density of people, the positioning information may include an indication of a location currently hosting a gathering of people (e.g., a location of a concert, festival, or other event). Such a location may be identified using various sources of information, such as location data associated with multiple other UEs in the vicinity of the gathering, calendar information, or the like.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of determining a position of a User Equipment (UE), comprising: receiving, at the UE, one or more wireless local area network (WLAN) signals; determining Channel State Information (CSI) data from the one or more WLAN signals; determining one or more environmental characteristics associated with an environment of the UE based on the CSI data; and sending information indicative of the one or more environmental characteristics to a location server (LS), or determining the position of the UE based at least in part on the one or more environmental characteristics, or any combination thereof.

Clause 2. The method of clause 1, wherein the one or more environmental characteristics are transmitted to the LS in an LTE Positioning Protocol (LPP) message.

Clause 3. The method of any of clauses 1-2, wherein determining the position of the UE is based at least in part on a database stored in local memory of the UE.

Clause 4. The method of any of clauses 1-3, wherein the one or more environmental characteristics comprise one or more environmental classifications, wherein the one or more environmental classifications comprise: a classification of the UE being in an enclosed space or in an open space, a classification of the UE being in motion or not in motion, a classification of the UE being in a dense environment or not, or any combination thereof.

Clause 5. The method of any of clauses 1-4, wherein the one or more environmental characteristics comprise dimensions of an enclosed space associated with the environment of the UE.

Clause 6. The method of clause 5, wherein the enclosed space comprises an interior of a vehicle.

Clause 7. The method of any of clauses 1-6, wherein the one or more environmental characteristics comprise an estimate of a number of people within proximity of the UE.

Clause 8. The method of any of clauses 1-7, wherein the received one or more WLAN signals comprise one or more transmitted WLAN signals that have reflected off of one or more objects in the environment of the UE, and wherein the one or more transmitted WLAN signals were transmitted by the UE.

Clause 9. A method of determining positioning information by a Location Server (LS), comprising: receiving, at the LS and from a User Equipment (UE), one or more environmental characteristics, based on wireless local area network (WLAN) sensing; and determining positioning information for the UE based at least in part on the one or more environmental characteristics.

Clause 10. The method of clause 9, wherein the positioning information comprises a position estimate for the UE.

Clause 11. The method of any of clauses 9-10 further comprising: configuring assistance data based at least in part on the one or more environmental characteristics; determining the positioning information based at least in part on the configured assistance data; and transmitting the positioning information to one or more devices, wherein the one or more devices include the UE.

Clause 12. The method of any of clauses 11 further comprising, determining that the UE is not within a line of sight of a cellular base station, wherein the configured assistance data is configured based at least in part on the determination that the UE is not within the line of sight of the cellular base station.

Clause 13. The method of any of clauses 9-12, wherein the one or more environmental characteristics comprise an indication that the UE is in motion.

Clause 14. The method of clause 13 further comprising, determining whether the UE is in motion, wherein the positioning information is based at least in part on the indication that the UE is in motion.

Clause 15. The method of any of clauses 9-14 further comprising: transmitting, to the UE, a first message requesting environmental inference capabilities of the UE using WLAN sensing; receiving, from the UE, a second message that indicates that the UE is capable of performing environmental inference using WLAN sensing; and in response to receiving the second message, transmitting a request for the one or more environmental characteristics.

Clause 16. The method of clause 15, wherein the request for the one or more environmental characteristics specifies at least one type of environmental characteristic.

Clause 17. A mobile device, comprising: a transceiver; a memory; and one or more processing units communicatively coupled with the transceiver and the memory, the one or more processing units configured to: receive one or more wireless local area network (WLAN) signals; determine Channel State Information (CSI) data from the one or more WLAN signals; determine one or more environmental characteristics associated with an environment of the mobile device based on the CSI data; and send information indicative of the one or more environmental characteristics to a location server (LS), or determine a position of the mobile device based at least in part on the one or more environmental characteristics, or any combination thereof.

Clause 18. The mobile device of clause 17, wherein the one or more environmental characteristics are transmitted to the LS in an LTE Positioning Protocol (LPP) message.

Clause 19. The mobile device of any of clauses 17-18, wherein determining the position of the mobile device is based at least in part on a database stored in the memory.

Clause 20. The mobile device of any of clauses 17-19, wherein the one or more environmental characteristics comprise one or more environmental classifications, wherein the one or more environmental classifications comprise: a classification of the mobile device being in an enclosed space or in an open space, a classification of the mobile device being in motion or not in motion, a classification of the mobile device being in a dense environment or not, or any combination thereof.

Clause 21. The mobile device of any of clauses 17-20, wherein the one or more environmental characteristics comprise dimensions of an enclosed space associated with the environment of the mobile device.

Clause 22. The mobile device of any of clauses 17-21, wherein the one or more environmental characteristics comprise an estimate of a number of people within proximity of the mobile device.

Clause 23. The mobile device of any of clauses 17-22, wherein the received one or more WLAN signals comprise one or more transmitted WLAN signals that have reflected off of one or more objects in the environment of the mobile device, and wherein the one or more transmitted WLAN signals were transmitted by the mobile device.

Clause 24. A location server (LS) for determining positioning information, comprising: a transceiver; a memory; and one or more processing units communicatively coupled with the transceiver and the memory, the one or more processing units configured to: receive, from a User Equipment (UE), one or more environmental characteristics, based on wireless local area network (WLAN) sensing; and determine positioning information for the UE based at least in part on the one or more environmental characteristics.

Clause 25. The location server (LS) of clause 24, wherein the positioning information comprises a position estimate for the UE.

Clause 26. The location server (LS) of any of clauses 24-25, wherein the one or more processing units are further configured to: configure assistance data based at least in part on the one or more environmental characteristics; determine the positioning information based at least in part on the configured assistance data; and transmit the positioning information to one or more devices, wherein the one or more devices include the UE.

Clause 27. The location server (LS) of clause 26, wherein the one or more processing units are further configured to determine that the UE is not within a line of sight of a cellular base station, wherein the configured assistance data is configured based at least in part on the determination that the UE is not within the line of sight of the cellular base station.

Clause 28. The location server (LS) of any of clauses 24-27, wherein the one or more processing units are further configured to determine whether the UE is in motion, wherein the positioning information is based at least in part on an indication that the UE is in motion.

Clause 29. The location server (LS) of any of clauses 24-28, wherein the one or more processing units are further configured to: transmit, to the UE, a first message requesting environmental inference capabilities of the UE using WLAN sensing; receive, from the UE, a second message that indicates that the UE is capable of performing environmental inference using WLAN sensing; and in response to receiving the second message, transmit a request for the one or more environmental characteristics.

Clause 30. The location server (LS) of clause 29, wherein the request for the one or more environmental characteristics specifies at least one type of environmental characteristic.

What is claimed is:

1. A method of determining a position of a User Equipment (UE), comprising:
   receiving, at the UE, one or more wireless local area network (WLAN) signals;
   determining Channel State Information (CSI) data from the one or more WLAN signals;
   determining, by the UE, one or more environmental characteristics associated with a physical environment the UE is in based on the CSI data, wherein the one or more environmental characteristics comprise dimensions of an enclosed space associated with the environment of the UE; and
   determining, by the UE, the position of the UE based at least in part on the one or more environmental characteristics.

2. The method of claim 1, wherein the one or more environmental characteristics are transmitted to the LS in an LTE Positioning Protocol (LPP) message.

3. The method of claim 1, wherein determining the position of the UE is based at least in part on a database stored in local memory of the UE.

4. The method of claim 1, wherein the one or more environmental characteristics comprise one or more environmental classifications, wherein the one or more environmental classifications comprise: a classification of the UE being in the enclosed space or in an open space, a classification of the UE being in motion or not in motion, a classification of the UE being in a dense environment or not, or any combination thereof.

5. The method of claim 1, wherein the enclosed space comprises an interior of a vehicle.

6. The method of claim 1, wherein the one or more environmental characteristics comprise an estimate of a number of people within proximity of the UE.

7. The method of claim 1, wherein the received one or more WLAN signals comprise one or more transmitted WLAN signals that have reflected off of one or more objects in the environment of the UE, and wherein the one or more transmitted WLAN signals were transmitted by the UE.

8. A mobile device, comprising:
  a transceiver;
  a memory; and
  one or more processing units communicatively coupled with the transceiver and the memory, the one or more processing units configured to:
    receive one or more wireless local area network (WLAN) signals;
    determine Channel State Information (CSI) data from the one or more WLAN signals;
    determine, by the mobile device, one or more environmental characteristics associated with a physical environment the mobile device is in based on the CSI data, wherein the one or more environmental characteristics comprise dimensions of an enclosed space associated with the environment of the mobile device; and
    determine, by the mobile device, a position of the mobile device based at least in part on the one or more environmental characteristics.

9. The mobile device of claim 8, wherein the one or more environmental characteristics are transmitted to the LS in an LTE Positioning Protocol (LPP) message.

10. The mobile device of claim 8, wherein determining the position of the mobile device is based at least in part on a database stored in the memory.

11. The mobile device of claim 8, wherein the one or more environmental characteristics comprise one or more environmental classifications, wherein the one or more environmental classifications comprise: a classification of the mobile device being in the enclosed space or in an open space, a classification of the mobile device being in motion or not in motion, a classification of the mobile device being in a dense environment or not, or any combination thereof.

12. The mobile device of claim 8, wherein the one or more environmental characteristics comprise an estimate of a number of people within proximity of the mobile device.

13. The mobile device of claim 8, wherein the received one or more WLAN signals comprise one or more transmitted WLAN signals that have reflected off of one or more objects in the environment of the mobile device, and wherein the one or more transmitted WLAN signals were transmitted by the mobile device.

* * * * *